(12) United States Patent
Blue

(10) Patent No.: US 6,955,406 B2
(45) Date of Patent: Oct. 18, 2005

(54) ALTITUDE COMPENSATING TRAILER BRAKE SYSTEM

(75) Inventor: Scott Blue, South Bend, IN (US)

(73) Assignee: BluDot, Inc., South Bend, IN (US)

( * ) Notice: Subject to any disclaimer, the term of this patent is extended or adjusted under 35 U.S.C. 154(b) by 9 days.

(21) Appl. No.: 10/782,170

(22) Filed: Feb. 18, 2004

(65) Prior Publication Data

US 2005/0178622 A1 Aug. 18, 2005

(51) Int. Cl.[7] ............................................. F15B 15/18
(52) U.S. Cl. ......................... 303/7; 303/15; 188/112 R
(58) Field of Search ................................ 303/3, 15, 20, 303/7; 188/112 B, 112.17

(56) References Cited

U.S. PATENT DOCUMENTS

| | | | |
|---|---|---|---|
| 4,358,928 A | * | 11/1982 | Kotwicki ..................... 60/397 |
| 4,412,416 A | | 11/1983 | Van House |
| 5,823,637 A | | 10/1998 | Blue |
| 5,846,164 A | | 12/1998 | Harada |
| 6,006,716 A | | 12/1999 | Harada et al. |
| 6,095,116 A | | 8/2000 | Matsushita et al. |
| 6,416,138 B1 | | 7/2002 | Barnett |
| 6,557,948 B2 | | 5/2003 | Greaves ......................... 303/7 |
| 6,687,609 B2 | * | 2/2004 | Hsiao et al. ................. 701/207 |
| 2003/0019473 A1 | | 1/2003 | Wild et al. |
| 2003/0038534 A1 | | 2/2003 | Barnett |
| 2003/0062767 A1 | | 4/2003 | Greaves, Jr. |

* cited by examiner

Primary Examiner—Matthew C. Graham
(74) Attorney, Agent, or Firm—Alston & Bird LLP

(57) ABSTRACT

The invented apparatus is designed for use with a tow vehicle and trailer combination. The apparatus comprises a controller, a vacuum supply sensor, and a sensor unit used to measure the barometric pressure and/or elevation of the current location of the tow vehicle/trailer combination. Using information from the sensor unit, the controller determines a vacuum pump activation level and/or deactivation level appropriate for the ambient pressure in which the apparatus is operating. By monitoring the signal supplied by the vacuum supply sensor and by operating a vacuum pump switch signal, the controller maintains a supply of vacuum between the activation and deactivation levels. In this manner, the controller can compensate for changes in local conditions so as to operate the vacuum pump in an efficient manner while maintaining an adequate supply of vacuum for operation of the trailer brake system.

54 Claims, 15 Drawing Sheets

| Altitude (ft) | Pressure (in.Hg absolute) | Activation Level (in. Hg Vacuum) | Deactivation Level (in. Hg Vacuum) |
|---|---|---|---|
| -1000 | 31.0185 | 18 | 24 |
| -900 | 30.9073 | 18 | 24 |
| 0 | 29.9213 | 18 | 24 |
| 500 | 29.3846 | 18 | 24 |
| 1000 | 28.8557 | 18 | 24 |
| 1500 | 28.3345 | 18 | 24 |
| 2000 | 27.8210 | 18 | 24 |
| 3000 | 26.8167 | 18 | 23 |
| 4000 | 25.8418 | 18 | 23 |
| 6000 | 23.9782 | 18 | 22 |
| 8000 | 22.2250 | 18 | 21 |
| 10000 | 20.5770 | 17 | 19 |
| 12000 | 19.0294 | 16 | 18 |
| 14000 | 17.5774 | 14 | 16 |
| 16000 | 16.2164 | 12 | 15 |

Fig. 3

ALTITUDE COMPENSATING TRAILER BRAKE SYSTEM

BACKGROUND OF THE INVENTION

1. Field of the Invention

This invention is directed to an apparatus and method for generating a vacuum source that is sufficient to operate vacuum-controlled brakes of a trailer towed by a vehicle and controlling a vacuum pump for efficient generation of the vacuum source.

2. Description of Related Art

The disclosure of U.S. Pat. No. 5,823,637 provides background relevant to the present invention and is herein incorporated by reference.

Towed trailers are commonly used on roadways to haul various loads from one place to another. Trailers provide cargo capacity to vehicles designed primarily to tow, such as large diesel trucks, and supplement the cargo capacity of other vehicles, such as passenger cars, vans, pickup trucks, dual rear axle trucks, sport utility vehicles, and other types of vehicles capable of towing a trailer. Because different types of trailers can be towed, the type of added cargo carrying capacity is flexible depending on the trailer type. For example, a diesel cab can alternately carry a load of retail electronics in an enclosed freight trailer or gasoline in a tank trailer, while a pickup truck can pull a fishing boat or transport horses using the appropriate trailers.

Unfortunately, in many cases, while the tow vehicle may be powerful enough to pull a given trailer, the tow vehicle may not have adequate braking capability to slow the vehicle and the trailer at a safe rate. Accidents can result due to insufficient braking capability in the tow vehicle to stop the combined vehicle and trailer in time to prevent an accident. In cases where the tow vehicle has adequate braking capacity to slow the combined mass of the tow vehicle and the trailer, towing a trailer can still be hazardous. As the tow vehicle's brakes are applied, the tow vehicle slows, and the braking force of the tow vehicle's brakes is transferred to the trailer through a pivoted coupling between the tow vehicle and the trailer. This will normally slow the trailer along with the tow vehicle under ideal braking conditions. If, however, braking occurs during a turn, for example, or in a rapid manner, such as in a panic stop, or in other less than ideal conditions, the tow vehicle could slow while the trailer's momentum continues to carry the trailer into the tow vehicle. This can cause the trailer to swing to one side of the tow vehicle, pivoting about its coupling to the tow vehicle. This condition is commonly referred to as a "jackknife." Jackknifing has been the cause of many serious, often fatal, road accidents.

Safely towing a trailer with a vehicle often requires an independent brake system for the trailer. For effective operation, the trailer brake system should be coupled to the tow vehicle brake system in a manner that coordinates the braking action of the two systems when the driver applies the tow vehicle's brake pedal. Various types of trailer brake systems exist, including vacuum-over-hydraulic brake systems. These vacuum-over-hydraulic brake systems require the generation of a vacuum control signal proportionate to the driver's application of the tow vehicle brakes. In addition to the vacuum control signal, these trailer brake systems require a source of service vacuum to provide the vacuum power needed to operate the trailer's brake system.

Generally, most vehicles with carbureted intake systems generate a sufficient vacuum source at their air intake manifolds to operate not only the tow vehicle's brake system, but also the trailer's brake system, assuming the trailer's size and load to be appropriate for the tow vehicle. However, vehicles with more modern intake systems, such as those equipped with electronic fuel injection, tend to generate insufficient vacuum to operate an independent trailer brake system. These vehicles cannot effectively operate a vacuum-controlled trailer brake system without a supplemental source of vacuum. In the case of diesel engines, practically no vacuum supply is generated, so the entire vacuum supply for a trailer brake system must be generated independently for use with a tow vehicle having a diesel engine.

The requisite vacuum needed to operate a trailer brake system can be supplied by a vacuum pump. Vacuum supplied by a vacuum pump can be used to supplement vacuum supplied by a tow vehicle's engine or serve as the only source of vacuum, depending on the application. The use of both electric and belt driven pumps is known in the art.

Belt-driven vacuum pumps can use rotational motion from the tow vehicle's engine to generate a vacuum supply. These installations require mountings and belts to engage the pump with the tow vehicle's engine. This can be disadvantageous as the pumps, mountings and belts are virtually unique to the particular type of vehicle in which they are installed due to the manufacturer's design of the engine, belt driven accessories, and belt routing. Therefore, because the vacuum pump, its mountings, and belts must be uniquely designed and separately manufactured for each type of vehicle, the belt-driven vacuum pump and its associated mountings and belts are relatively expensive. Additionally, because of the uniqueness of each pump system as applied to a specific vehicle, the pump system cannot be moved from the original truck to a new vehicle of different make and/or model (as used herein, "and/or" means any one, some or all of the things immediately before and after such term).

Electric pumps incorporate their own electric motor that is powered by the tow vehicle's electrical system. Trailer brake systems incorporating electric pumps have the advantage of not requiring elaborate hardware to interface the vacuum pump to the tow vehicle's engine. Because of this, a single design can be used across a number of different types of tow vehicles. Because a vacuum supply can be stored in a reservoir until it is needed for braking operation, it may be desirable to operate the vacuum pump intermittently to extend pump life and/or decrease load on the tow vehicle's engine or electrical system. Desired upper and lower vacuum supply levels can be selected and used to determine whether the vacuum pump should be activated to increase the vacuum supply, or deactivated to conserve the pump life or reduce loads on the tow vehicle's engine or electrical system.

Conditions in which a tow vehicle may operate can vary widely depending on the weather and other atmospheric conditions at a given location. The performance of a vacuum pump system can be affected by these ambient conditions. Specifically, if the vacuum pump system does not account for ambient pressure variation, for example, it is programmed with static vacuum supply levels for turning on and off the pump or it operates for a set period of time after activation regardless of ambient pressure, then the amount of vacuum that can be generated by the vacuum pump will vary with ambient pressure. Therefore, a vacuum pump system operated at a relatively high elevation with correspondingly low ambient pressure, the vacuum pump can be subject to turning on for extended periods of time beyond that necessary to generate a vacuum supply that is adequate to supply sufficient braking power for the trailer brake system. Although this circumstance does not pose a risk from the standpoint of providing adequate braking power, it can result in excessive wear of the vacuum pump. In addition, excessive operation of the vacuum pump may generate unnecessary noise and cause annoyance to the driver of the tow vehicle. It would be desirable to provide a vacuum pump system that ensures an adequate supply of vacuum for trailer brake operation while operating the vacuum pump in an efficient manner.

Therefore, a trailer brake system is needed that can compensate for the effects of ambient conditions on vacuum pump performance.

BRIEF SUMMARY OF THE INVENTION

This invention, in its various embodiments, overcomes the above-noted disadvantages. In a first embodiment, an apparatus in accordance with this invention comprises a controller, a vacuum supply sensor, and an ambient pressure sensor. The apparatus can also comprise a vacuum pump. The vacuum supply sensor and the ambient pressure sensor are coupled to the controller. The vacuum supply sensor detects the vacuum pressure level of a vacuum supply, and generates a signal that indicates the level or amount of vacuum pressure available. The ambient pressure sensor detects the pressure of the ambient air in which the apparatus is operating and generates a signal that indicates the pressure level of the ambient air. The controller generates a vacuum pump switch signal that can be used to control the operation of a vacuum pump. The controller generates the vacuum pump switch signal based on the signals supplied to the controller by the vacuum supply sensor and the ambient pressure sensor.

The controller can be programmed to determine a deactivation level for the vacuum pump switch signal based on the signal generated by the ambient pressure sensor. The controller can further be programmed to deactivate the vacuum pump switch signal if the sensed vacuum level of the vacuum supply is equal to or greater than the deactivation level. To determine the deactivation level the controller can retrieve a deactivation level from computer readable memory based on the ambient pressure signal. Alternatively, the controller can determine the deactivation level by performing a calculation based on the ambient pressure signal. The deactivation level can vary as the ambient pressure in which the apparatus is operating varies.

The controller can be further programmed to determine an activation level for the vacuum pump switch signal based on the signal generated by the ambient pressure sensor. The controller can activate the vacuum pump switch signal if the sensed vacuum level of the vacuum supply is equal to or less than the activation level. To determine the activation level the controller can retrieve an activation level from computer-readable memory based on the ambient pressure signal. Alternatively, the controller can determine the activation level by performing a calculation based on the ambient pressure signal. The activation level can vary as the ambient pressure in which the apparatus is operating varies.

In another embodiment, an apparatus in accordance with the present invention comprises a controller and an absolute vacuum supply sensor. The absolute vacuum supply sensor detects the pressure of a vacuum supply and generates a signal that indicates the absolute pressure of the vacuum supply. The controller is coupled to the absolute vacuum supply sensor, and in this embodiment the controller is programmed to activate and deactivate a vacuum pump switch signal at predetermined absolute pressure levels.

In yet another embodiment, an apparatus in accordance with the present invention comprises a vacuum supply sensor, a global positioning system (GPS) receiver, and a controller. The vacuum supply sensor and the GPS receiver are coupled to the controller. The vacuum supply sensor detects the vacuum pressure level of a vacuum supply, and generates a signal that indicates the level or amount of vacuum pressure available. The GPS receiver generates a signal representing the location of the apparatus, which is indicative of its elevation. The controller generates a vacuum pump switch signal that can be used to control the operation of a vacuum pump. The controller generates the vacuum pump switch signal based on the signals supplied to the controller by the vacuum supply sensor and the GPS receiver.

The controller can be programmed to determine a deactivation level for the vacuum pump switch signal based on the signal generated by the GPS receiver. The controller can further be programmed to deactivate the vacuum pump switch signal if the sensed vacuum level of the vacuum supply is equal to or greater than the deactivation level. To determine the deactivation level the controller can retrieve a deactivation level from memory based on the signal generated by the GPS receiver. Alternatively, the controller can determine deactivation level by performing a calculation based on the signal generated by the GPS receiver. The controller can vary the deactivation level as the apparatus travels to varying elevations.

The controller can be further programmed to determine an activation level for the vacuum pump switch signal based on the signal generated by the GPS receiver. The controller can activate the vacuum pump switch signal if the sensed vacuum level of the vacuum supply is equal to or less than the activation level. To determine the activation level, the controller can retrieve an activation level from computer readable memory based on the signal generated by the GPS receiver. Alternatively, the activation level can be determined by performing a calculation based on the signal generated by the GPS receiver. The controller can vary the activation level as the ambient pressure in which the apparatus is operating varies.

A method according to the present invention comprises steps of sensing a pressure level of a vacuum supply of a trailer brake system, sensing an ambient air pressure level, and controlling a vacuum pump based on the sensed vacuum supply pressure level and ambient air pressure level. One or more pressure sensors can perform the sensing steps. The controlling step can be performed by a controller that is coupled to receive the sensor signals indicating the respective sensed pressures from the sensor(s), and uses such signals to generate a control signal to activate and deactivate a vacuum pump for generating the vacuum supply used by the trailer brake system.

A method according to the present invention comprises steps of sensing a pressure level of a vacuum supply of a trailer brake system, sensing an ambient air pressure level in which the trailer brake system is operating, determining a vacuum pump deactivation level based on the ambient air pressure, comparing the pressure level of the vacuum supply with the deactivation level, and deactivating a vacuum pump switch signal from an activated state if the pressure of the vacuum supply is greater than the deactivation level. The sensing steps can be performed by one or more sensors which generate signal(s) based on the sensed pressure levels. A controller can perform the determining, comparing, and deactivating steps based on the sensor signal(s), to deactivate the vacuum pump switch signal.

Another method according to the present invention comprises the steps of sensing a pressure of a vacuum supply, determining an elevation of a trailer brake system, determining a vacuum pump deactivation level based on the elevation of the trailer brake system, comparing the pressure level of the vacuum supply with the deactivation level, and deactivating a vacuum pump switch signal if the pressure level of the vacuum supply is greater than or equal to the deactivation level. The sensing step can be performed by a sensor which generates a signal based on the sensed pressure level. A controller can perform the determining, comparing, and deactivating steps based on the sensor signal(s), to deactivate the vacuum pump switch signal.

These together with other features and advantages, which will become subsequently apparent, reside in the details of construction and operation as more fully hereinafter described and claimed, reference being made to the accompanying drawings, forming a part hereof, wherein like numerals refer to like parts throughout the several drawings.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is an example table of activation and deactivation levels for a vacuum pump for a trailer brake system corresponding to various pressures and elevations.

DETAILED DESCRIPTION OF THE INVENTION

Figure 1:
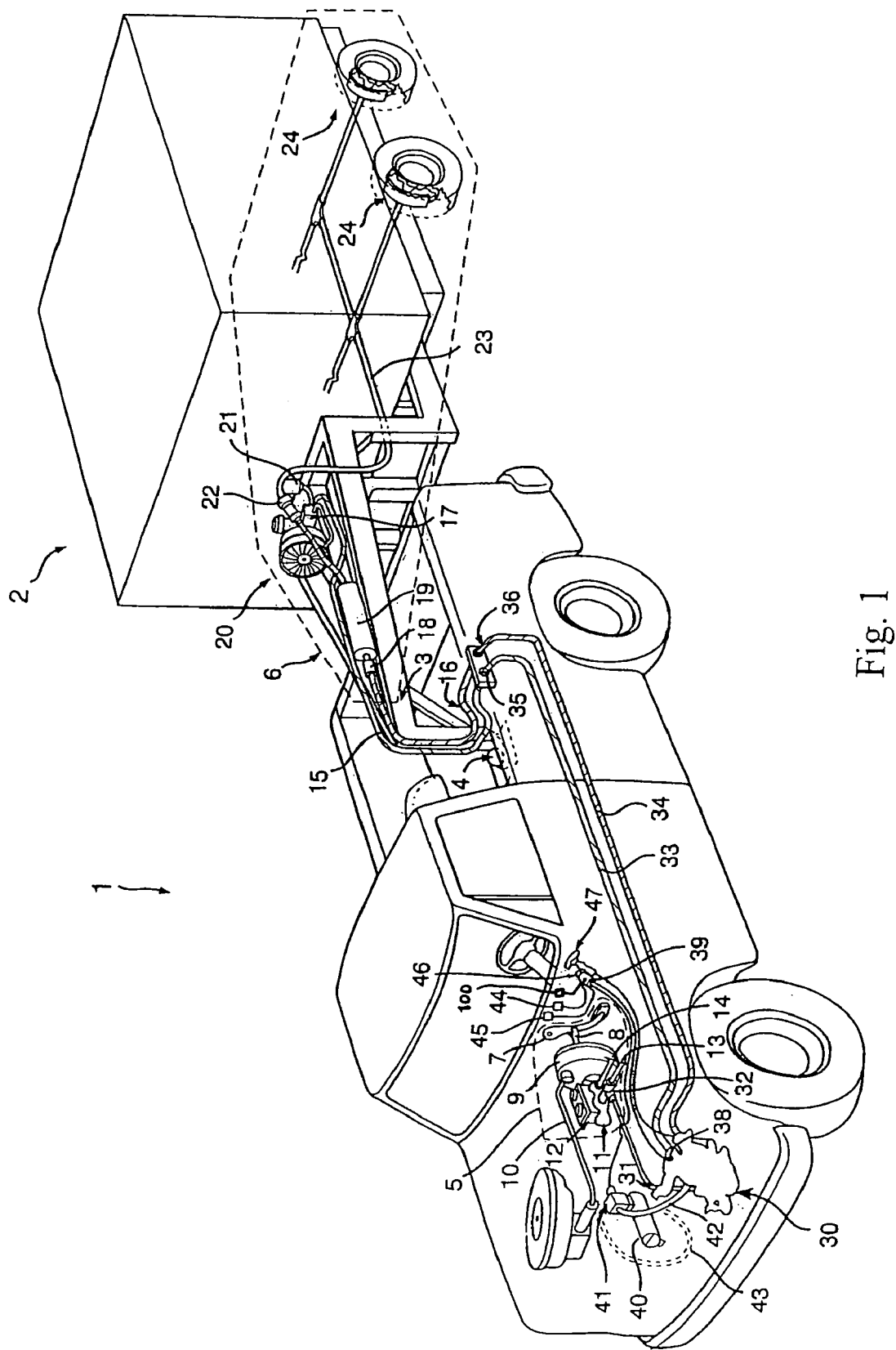
FIG. 1 is a perspective view of relevant portions of the tow vehicle and trailer brake systems, and the invented apparatus.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The conventions for pressure measurement units adopted for use in this document are as follows. By definition, vacuum is negative air pressure or air pressure that is less than ambient atmospheric air pressure. The most common unit to describe air pressure related to atmospheric conditions is 'inches of mercury' ("Hg) in the United States or milliBar in International Units. If atmospheric air pressure is defined to be zero inches of mercury (0" Hg), then the vacuum pressure level X can be defined as being at negative X inches of mercury (-X"Hg), where X is a measure of the amount by which the pressure level is below atmospheric air pressure. For example, minus twenty inches of Mercury (-20"Hg) is twenty units below atmospheric air pressure on this relative-to-ambient scale, or 20"Hg of vacuum. In addition, if a given vacuum pressure level is greater than another vacuum pressure level, this means that the given vacuum pressure level is further below atmospheric pressure than that other vacuum pressure level. Conversely, if a given vacuum pressure level is less than another vacuum pressure level, then the given vacuum pressure level is closer to atmospheric pressure than that other vacuum pressure level.

An alternate scale for measuring air pressure levels is using an absolute pressure scale. On an absolute pressure scale pressure levels are measured relative to a perfect vacuum and are by definition positive since a pressure level less than a perfect vacuum is impossible. On this scale, a perfect vacuum is defined as 0"Hg and standard pressure at sea level is 29.92"Hg. This scale is commonly used in weather forecasting and aviation. It is important to note that the barometric pressure readings often given by weather agencies are normalized to standard temperature and pressure. That is, the actual pressure reading (or station pressure) for a location is not usually reported. For stations above sea level, the reported reading is equivalent to what a barometer at that location would read if that barometer were placed in a hypothetical hole drilled down to sea-level and the air was at standard temperature. Pressure readings are normalized in this manner so that pressure levels across a number of locations with differing altitudes and weather conditions can be compared. In this document, station pressure, that is the actual non-normalized pressure reading, will be used in referring to ambient pressure unless otherwise indicated.

Additionally, in this document, references to amounts of vacuum will generally be given on a relative pressure scale (relative to ambient). That is, 25"Hg of vacuum is equal to the ambient air pressure minus 25"Hg. Atmospheric air pressure levels referred to in the document will generally be given on an absolute pressure scale. That is, 29.92"Hg equals a perfect vacuum of 0"Hg plus 29.92"Hg. In other cases where the pressure scale used may be difficult to ascertain for those skilled in the art, the scale used will be noted.

In FIG. 1, a tow vehicle 1 is coupled to a trailer 2. More specifically, the trailer is coupled to the tow vehicle with a hitch 3 that is connected to a coupler 4 located in the tow vehicle's bed. The coupler securely holds the hitch to the tow vehicle, yet allows the hitch to swivel about the coupler when the tow vehicle turns.

The tow vehicle and trailer comprise brake systems 5, 6, respectively, indicated with broken lines in FIG. 1. The vehicle's brake system can be one of a number of conventional brake systems whose configurations are well-known and understood by persons of ordinary skill in this technology. A limited description of the tow vehicle's brake system is provided below.

1. The Tow Vehicle Brake System

In FIG. 1, the vehicle's brake system comprises a brake pedal 7, a rod 8, diaphragm (not shown), a vacuum booster 9, a vacuum line 10, a piston 11, a master cylinder 12, and front and rear brake fluid lines 13, 14. The brake pedal is mounted to swing about a pivot that is fixed to the vehicle. The brake pedal is connected to the rod that extends into the booster. The booster has a diaphragm to which the rod is attached and through which the rod extends into the master cylinder. The first compartment of the booster (that facing the rear of the vehicle) defines an opening that communicates with atmosphere. The second compartment on the opposite side of the diaphragm relative to the first compartment, is air-tight, and is connected to the vacuum line that is coupled in communication with the tow vehicle's engine air intake manifold or external vacuum pump. The vacuum line supplies vacuum generated by the tow vehicle's engine, to the second compartment. The pressure differential across and the size of the diaphragm create a bias that assists the driver when applying the brakes. The rod extends through the diaphragm and is connected to the piston that is movable in the master cylinder. If the driver depresses the brake pedal, the rod forces the piston head to move in the master cylinder, which displaces brake fluid from the cylinder's reservoir into the brake lines 13, 14 that supply brake fluid to activate the front and rear brakes, respectively, of the tow vehicle. If the driver releases the brake pedal, the back pressure of the brake fluid releases the front and rear brakes, and also causes the piston to move the rod in a manner that causes the brake pedal to swing about its pivot toward the driver.

2. The Trailer Brake System

The trailer brake system 6 comprises vacuum control and service lines 15, 16, relay valve 17, check valve 18, vacuum tank 19, booster 20, a diaphragm and piston (not shown), air filter 21, cylinder 22, brake line 23, and trailer brakes 24. The vacuum control line 15 is coupled in communication with the relay valve. The vacuum control signal carried on the line 15 controls the state of the relay valve that in turn controls whether and the degree to which the trailer brake system is activated. The vacuum service line is coupled in communication with the check valve that is normally open to receive vacuum, but that will close if the vacuum pressure on the input side of the check valve rises above that on the output side of the check valve. The check valve is coupled in communication via a line to the vacuum tank that stores a vacuum supply for the trailer brake system. The opposite side of the vacuum tank is coupled in communication with the relay valve. The relay valve thus receives a supply of service vacuum and a supply of air at atmospheric pressure. The booster has an internal diaphragm (not shown) that divides the booster into two compartments. The relay valve is coupled in communication with the first compartment of the booster that is closer to the rear of the trailer, to couple the service vacuum via the vacuum tank to the first compartment. The relay valve is also coupled to communicate with the booster's second compartment. The relay valve is structured and functions so that, if the vacuum control signal on the line 15 decreases in vacuum pressure level due to the driver's application of the brakes, the relay valve couples the line terminated by the air filter 21 into communication with the booster's second compartment, to allow air from atmosphere into the air filter, through the relay valve and into the booster's second compartment, in an amount proportional to the pressure level of the vacuum control signal. The entrance of air into the second compartment creates a pressure differential across the diaphragm to which the piston is attached. The diaphragm deflects toward the trailer's rear, driving the piston into the cylinder 22. Hydraulic fluid contained by the piston and cylinder is driven in the lines 23 to activate the trailer's brakes 24. Conversely, if the vacuum control signal rises in vacuum pressure level due to the driver's release of the brakes, the relay valve decouples air from the filter 21 from the second compartment of the booster 20, so that the vacuum supply signal is coupled through the relay valve to restore vacuum in the second compartment. The booster's diaphragm thus relaxes toward its neutral position and withdraws the piston from the cylinder 22 to allow hydraulic fluid to return to the cylinder, thus releasing the trailer's brakes.

3. The Tow Vehicle/Brake System Interface

The invented apparatus can comprise a control valve 30 that generally serves to coordinate the braking action of the tow vehicle and trailer brake systems. The control valve is coupled in communication with one of the rear brake line connections to the master cylinder 12. More specifically, the control valve is coupled to communicate with one end of a line 31 that has a second, opposite end communicatively coupled to a first leg of a T-conduit 32. The T-conduit has a second leg coupled in communication with the master cylinder's rear brake line, and has a third leg coupled to communicate with the master cylinder's rear brake output. The control valve is also coupled to communicate with vacuum control and service lines 33, 34. The lines 33, 34 are coupled to respective quick-release connectors 35, 36 to which respective lines 15, 16 are normally coupled in communication, but which can be disconnected to allow separation of the tow vehicle and trailer. The control valve also receives air from atmosphere and a vacuum supply generated by a vacuum pump.

The operation of the control valve in interfacing the tow vehicle brake system with the trailer brake system is as follows. If the driver activates the tow vehicle's brakes, the resulting hydraulic brake signal from the master cylinder travels through its connection to and through the T-conduit, through the line 31 and into the control valve 30. The control valve 30 allows a proportional amount of air into the vacuum control line 33, based on the hydraulic signal, that causes the trailer brakes to be activated proportionally to the degree to which the driver applies the brakes. Conversely, if the driver releases the tow vehicle's brakes, the back pressure of the hydraulic fluid causes it to flow back to a degree from the control valve through the line 31, T-conduit 32 and back toward the master cylinder 12. The control valve is coupled to communicate its vacuum supply at a substantially constant pressure level to the vacuum service line 34 to operate the trailer brake system. The tow vehicle comprises a hand brake 47 coupled by a cable or the like to the control valve, that allows the driver to set the control valve so that the trailer brake system can be applied independently of the vehicle brake system.

The performance of a vacuum pump used to generate the vacuum supply will vary with the ambient climate conditions in which the pump is operating. The density of the air in which the vacuum pump is operating affects vacuum pump performance. Air density is related to the ambient pressure, temperature, and humidity. Of these, changes in ambient pressure encountered while traveling have a significant effect on vacuum pump performance in a trailer brake system. Air pressure at any area on the earth's surface is the result of the force of the air above that area being pulled toward the earth by the earth's gravity, that is, the weight of the air above that area. The earth's surface has peaks and valleys, but the atmosphere has a relatively constant height so that by traveling to a higher elevation, the amount of air above the surface at that location is less than the amount of air at a lower elevation. Therefore higher elevations generally have a reduced ambient air pressure level than lower elevations.

The range of altitudes at the locations where a tow vehicle, trailer combination can travel covers a large spectrum. Changes in altitude during travel can occur rapidly while traveling through mountainous regions. For example, the highest point in California is Mount Whitney which rises to 14,495 feet above sea level. Mount Whitney is less than 100 miles from Death Valley, the lowest point in North America at 242 feet below sea level. This change in elevation results in a change in pressure greater than 12 inches of Mercury ("Hg) between the two locations.

It may not be desirable to operate a vacuum pump continuously in a trailer braking system. This may be due to the pump not being designed for continuous use such that continuous operation damages the pump. Where a pump could be run continuously, intermittent operation of the pump can extend the useful life of the pump, and/or it can be desirable not to load the tow vehicle's electrical system in a needless manner. Therefore it is desirable to establish a range over which the vacuum pump operates so that a sufficient vacuum is generated for a trailer brake system while efficiently utilizing the vacuum pump. This range can comprise lower and upper vacuum levels of vacuum supply produced by the vacuum pump at which the pump is activated and deactivated, respectively.

However, the amount of vacuum that a given vacuum pump is capable of generating will decrease as the ambient pressure decreases. A vacuum level easily achieved by the pump at sea level for example, may not be achievable when the pump is operating at higher elevations. In certain ambient conditions then, it is possible that a vacuum pump in a trailer brake system would be unable to produce a level of vacuum easily reached when operating in ambient conditions more favorable to pump performance. If a vacuum pump controller is programmed to operate the vacuum pump such that the vacuum supply level at which the pump is turned off is a static value, the pump could run continuously when operating at lower ambient pressures. Continuous use of the pump in this manner could potentially damage the pump. Merely choosing a value for vacuum pump shutoff that the pump could achieve in ambient conditions that the trailer brake system might encounter in a worst-case sce-nario could cause unnecessary wear of the vacuum pump in higher ambient pressure conditions more favorable to vacuum pump performance.

4. The Invented Apparatus

The invented apparatus generally comprises a vacuum supply sensor 38, a controller 39, a vacuum pump 40, and an ambient pressure sensor 100. The vacuum supply sensor 38 is coupled to communicate with the vacuum supply required to generate at least the vacuum supply signal, and can also be used to generate the vacuum control signal since it is derived in part from the vacuum supply signal. The vacuum supply sensor is coupled to sense the pressure of the vacuum supply communicating with the control valve's interior chamber, that is used by the control valve to generate the vacuum control signal and the service vacuum required to operate the trailer brake system. Based on the sensed vacuum pressure level, the vacuum supply sensor generates an electric signal indicative of the vacuum supply pressure, referred to herein as the 'vacuum supply level signal'. The vacuum supply sensor is coupled to provide the electric signal to the controller. The ambient pressure sensor is configured to generate an electric signal indicative of the ambient air pressure and supply this electric signal to the controller. This signal is referred to herein as the 'ambient pressure signal'.

The controller can comprise a microcontroller, microprocessor, programmable gate array (PGA), field programmable gate array (FPGA), programmable logic controller (PLC), programmed logic array (PLA), programmed array logic (PAL), a logic circuit composed of one or more logic gates, an analog circuit of one or more operational amplifiers, resistors, capacitors, and/or inductors, or other processing device. The controller receives electric power from the tow vehicle's electrical system. The controller can be positioned underneath the dashboard inside the driver's compartment of the tow vehicle. The controller is programmed to periodically read the ambient pressure signal generated by the ambient pressure sensor. Using the ambient pressure signal the controller is programmed to determine the operational window in which the vacuum pump should be operated for the ambient pressure read from the ambient pressure sensor. The operational window comprises a first vacuum pressure level and a second vacuum pressure level. The first of these vacuum pressure levels, referred to herein as the activation level, is the vacuum supply level at which the pump should be activated (from an existing deactivated state) to produce additional vacuum supply. The second of these vacuum pressure levels, referred to herein as the deactivation level, is the vacuum supply level at which the pump should be deactivated (from an existing activated state).

Figure 2:
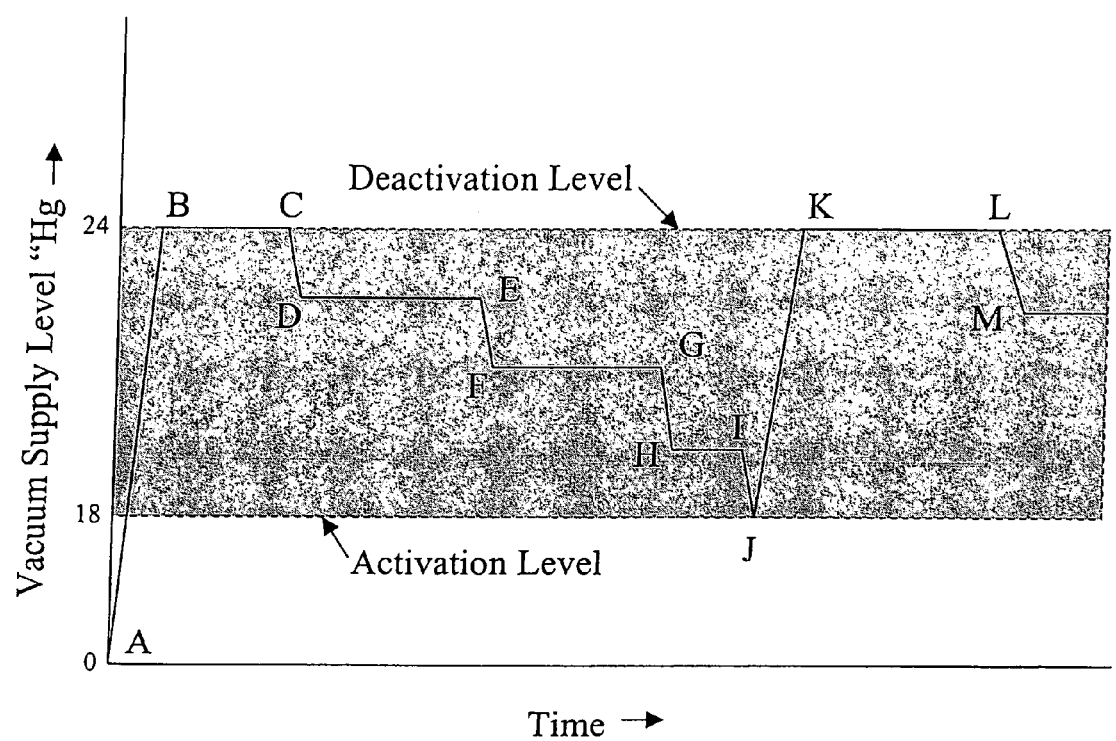
FIG. 2 is an example graph of vacuum supply level of a trailer brake system with respect to time illustrating how a supply of vacuum decreases with use of a trailer brake system to a level at which the vacuum pump must be activated to restore the vacuum supply, after which the vacuum supply increases to a level at which the vacuum pump is deactivated to avoid unnecessary use of the vacuum pump.

FIG. 2 is an example graph of the vacuum supply level with respect to time of a trailer brake system according to the present invention. The graph illustrates the general operation of the controller in activating and deactivating the vacuum pump to maintain a vacuum supply for the trailer brake system. The levels shown and rates of vacuum use and supply are for purposes of example only. Actual values will depend on the programming of the controller and other aspects of the design of the trailer brake system. The graph is not drawn to scale. The graph shows static activation and deactivation levels 18"Hg and 24"Hg respectively. At point A the vacuum supply is empty when power to the system is switched on. The controller activates the vacuum pump and the vacuum supply level rises to point B. At point B the vacuum supply level reaches the deactivation level and the controller deactivates the vacuum pump. From point B to point C the brakes of the tow vehicle/trailer are not applied so the vacuum supply level remains constant. At point C the brakes of the vehicle/trailer combination are applied and the vacuum supply level drops to point D. At point D the tow vehicle/trailer brakes are released and the vacuum supply remains constant to point E where the brakes are again applied to drop the vacuum level to point F. Operation continues in this manner until the vacuum supply drops to the activation level at point J. At point J the controller activates the vacuum pump causing the vacuum supply level to rise to the deactivation level at point K. Here the controller deactivates the vacuum pump, and the vacuum supply level remains constant until the brakes are again applied at point L. Hence, it is apparent from FIG. 2 that operation of the apparatus controls the vacuum supply level of the trailer brake system within the range of defined by the activation and deactivation levels.

The graph of FIG. 2 depicts the activation and deactivation levels as static values. Depending on the ambient pressure in which the present invention is operating, however, these values may be changed by the controller. If these values are not changed and static values are used to turn the vacuum pump on and off at higher elevations, a situation can occur where the vacuum pump runs continuously in a futile attempt to attain a vacuum supply level that is impossible under the conditions. For example, if the trailer/vehicle combination is driven to an altitude of 6000 feet above sea level, the ambient pressure (at standard temperature and humidity) is less than 24"Hg (absolute) which is the value used as the example deactivation level in FIG. 2. It would be impossible for a vacuum supply level of 24"Hg to be achieved since a vacuum of less then 0"Hg is not possible. Furthermore, a vacuum pump cannot produce a perfect vacuum, so merely adjusting the deactivation level to match the ambient pressure is insufficient to insure that the vacuum supply reaches the deactivation level. The vacuum production ability of the pump at the ambient pressure should be considered in determining the deactivation level. Therefore, the deactivation level is preferably a variable level determined by the controller during operation of the trailer braking system based on the ambient pressure signal read from the ambient pressure sensor.

At yet higher elevations, the activation level can require adjustment as well. For example, at 14,000 feet above sea level the ambient pressure (at standard temperature and humidity) is less than the example activation level of 18"Hg depicted in FIG. 2. Therefore, the activation level is preferably a variable level determined by the controller based on the ambient pressure signal read from the ambient pressure sensor. The activation level should be safely above the minimum vacuum pressure at which proper generation of the vacuum control signal and also the service vacuum supply can be ensured. The activation level can, however, alternatively be a static value in some embodiments of the invention.

FIG. 3 shows an exemplary table of activation and deactivation levels for various altitudes and/or pressures. The altitude levels are given in feet above sea level. The pressure levels are given in "Hg absolute and correspond to the standard atmospheric pressure at the corresponding elevation (altitude). The activation and deactivation levels are given in "Hg of vacuum relative to the ambient pressure. The activation and deactivation levels shown are given as examples and will vary depending on the performance of the vacuum pump used in a given implementation. In general, the deactivation level for a particular pump should not be set too high for the pump to attain, nor should the activation level be set at a level that is too low for the pump to generate sufficient vacuum to operate the trailer brake system. A table such as that shown in FIG. 3 can be stored as data in a look-up table in the memory of the controller 39 for its use in generating activation and deactivation signals to control the pump based on the sensed pressure level(s) or GPS position. The table sets a correspondence between the altitude level, pressure level, activation level, and deactivation level quantized in a "stair-step-" or "postal-rate"-like fashion. Hence, for example, if the sensed altitude at which the trailer brake system were determined to be 8900 ft., the activation and deactivation levels would be those associated with the closest elevation for which data exists, in this case, the level of 8000 ft. Elevations from 9,000 to 10,999 ft. would be mapped to the activation and deactivation levels provided for 10,000 ft, and so forth. Alternatively, all levels from 8000 ft. to 9999 ft. could be mapped to the activation and deactivation levels for 8000 ft. Thus, all levels from a particular altitude or pressure level up to, but not including, the next successive level can be mapped to the same activation and deactivation levels. Those of ordinary skill in the art will recognize that the mapping of ambient pressure, altitude, and/or GPS coordinate to activation and deactivation levels can be performed in myriad ways. The overarching principle is that the mapping of the input variable (e.g., ambient pressure, altitude, and/or GPS coordinate) to output variable (activation and deactivation level) be sufficiently accurate to ensure that sufficient vacuum supply exists to operate the tow vehicle and trailer brake system while eliminating or at least reducing unnecessary use of the vacuum pump.

The table can include each of the columns of data shown in the table, or could include a subset of these columns. For example, altitude may be omitted entirely if the controller is programmed to determine the activation and deactivation levels without calculating or estimating the altitude of the vehicle/trailer combination. In other embodiments such as an embodiment utilizing a GPS receiver that can provide the altitude of the vehicle/trailer combination, the pressure data may be omitted. If the activation level is to be static, the activation level information may be omitted. In still other embodiments, instead of (or in addition to) storing the data in tables, mathematical functions representing the relationships between the data may be used. The controller 39 can utilize interpolation and/or extrapolation to determine activation and/or deactivation levels for altitude or sensed pressure levels in between the specific levels stored in the table in the memory of the controller 39. Furthermore, depending upon the application and specific pump used, quantization of levels can be made to intervals of any degree of generality or specificity useful for an application, so long as the vacuum pump generates a vacuum supply sufficient to safely operate the trailer brake system without excessive unnecessary use of the vacuum pump. Thus, for example, although the increments between altitude levels in the table of FIG. 3 are provided in intervals of one-thousand or two-thousand feet, such intervals could be made smaller such as by using increments of one-hundred feet or tens of feet, along with corresponding activation and deactivation levels. Similarly, the table can be such that pressure values are provided in tenths of "Hg along with corresponding activation and deactivation levels.

Figure 4:
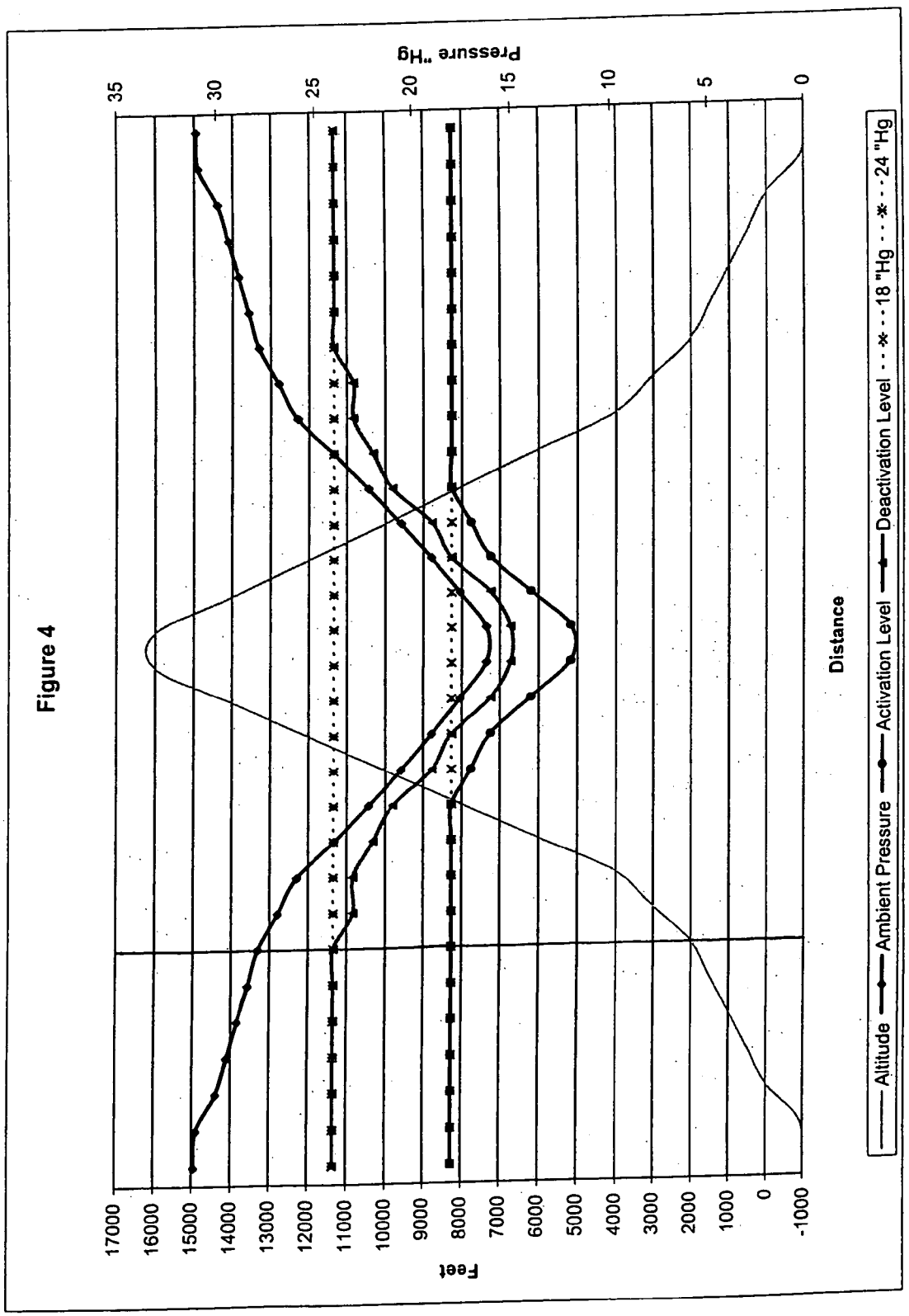
FIG. 4 is a graph depicting changes in activation and deactivation levels for a vacuum pump of a trailer brake system according to the present invention as it traverses a hypothetical 16,000 ft mountain.

FIG. 4 graphically depicts the relationships between altitude, pressure, activation level, and deactivation level according to the data in the table of FIG. 3 as a trailer/tow vehicle combination according to the present invention travels on a hypothetical roadway from 1000 feet below sea level, to over 16,000 feet above sea level, and back down to 1000 feet below sea level. The left axis of the graph shows altitude in feet above sea level. The line labeled "Altitude" traces the elevation change made by the trailer/tow vehicle combination which can be read from the left axis. The right axis of the graph shows pressure in inches of Mercury. The line labeled "Ambient Pressure" corresponds to the standard pressure at the current altitude of the trailer/tow vehicle combination. The value of the "Ambient Pressure" line can be read from the right axis in inches of Mercury (absolute). To read the pressure at an altitude of 2000 feet above sea level, for example, the point were the "Altitude" line crosses 2000 feet on the left axis should be located. Then the point on the "Ambient Pressure" line intersected by a vertical line drawn through the 2000 feet altitude point should be located. The value of this pressure can be read on the right axis (in this case, approximately 27.8"Hg). The line labeled "Activation Level" traces the activation level that the controller should use to control the operation of the vacuum pump at the corresponding altitude or pressure. The "Activation Level" can be read on the right axis in inches of Mercury relative to ambient. The line labeled "Deactivation Level" traces the deactivation level that the controller should use to control the operation of the vacuum pump at the corresponding altitude or pressure. The "Deactivation Level" can be read on the right axis in inches of Mercury relative to ambient. The two dashed lines are located at 18"Hg and 24"Hg relative to ambient as read from the right axis.

By plotting the data in this way it can be seen how the ambient pressure drops as the trailer/tow vehicle combination climbs in elevation. By plotting the ambient pressure in absolute pressure values while plotting the activation and deactivation levels in a relative to ambient pressure values using the same axis, the function of the controller in varying the activation and deactivation levels can be seen graphically. The controller adjusts the deactivation level to follow the vacuum producing capability of the vacuum pump at the current ambient pressure. Any vacuum supply levels on the upper side of the "Ambient Pressure" line are not possible given that the purpose of the vacuum pump is to generate a vacuum, albeit an imperfect one since a perfect vacuum is extremely difficult if not impossible to attain, which is by definition lower in pressure level than ambient pressure. Because of the nature of a vacuum pump, i.e., because it generates a vacuum, the "Activation Level" and "Deactivation Level" must necessarily fall below the "Ambient Pressure" line. The values for the deactivation level are chosen such that the vacuum pump is capable of producing a vacuum supply level corresponding to the deactivation level at the current ambient pressure. In this way the deactivation level of vacuum supply can be attained and the controller can deactivate the vacuum pump once that level is reached. The graph of FIG. 4 also shows how at higher elevations, the activation and deactivation levels must be adjusted by the controller relative to their levels at lower elevations to ensure that the activation level is not higher than the deactivation level. The controller also controls the vacuum supply so as to maintain a gap in pressure level between the activation and deactivation levels irrespective of the elevation. This allows the controller to operate the vacuum pump to produce vacuum up to the deactivation level and "rest" the pump until use of the brakes drains the vacuum reservoir to the activation level.

The "Activation Level" and "Deactivation Level" lines in FIG. 4 are shown as making smooth gradual transitions, however, these transitions can be made in stepwise increments or decrements. For example, if the data from the table of FIG. 2 is used by a controller without interpolating between the values, the controller can be implemented so as to change the activation and deactivation levels in 1"Hg increments. The resolution of the changes can depend on many factors including, for example, the number of data points stored in memory, available memory of the controller, the sampling rate of the controller, and the speed of the controller, and possibly others that may occur to those of ordinary skill in the art.

The controller is programmed to read the vacuum supply level signal generated by the vacuum supply sensor. The controller can read the vacuum supply level signal periodically (e.g., digital sampling of the vacuum supply level signal), at varying intervals (e.g., more frequent when the vacuum supply level signal is changing relatively rapidly and less frequent when such signal is relatively static), or on a continuous basis (e.g., the signal is in analog form, i.e., the controller has an analog or hybrid analog-digital structure). The controller compares the vacuum supply level signal with the activation level, and generates a vacuum pump control signal with an activated state if the sensed vacuum pressure is less than or equal to the activation level. Conversely, if the controller determines that the vacuum supply pressure is greater than the activation level, the controller does not affect the former state of the vacuum pump switch signal with a deactivated state. The controller also reads the vacuum supply level signal from the sensor on a periodic, varied interval, or continuous basis. The controller compares the sensed vacuum supply level signal indicating the vacuum pressure level with the deactivation level. If the sensed vacuum pressure level is greater than or equal to the deactivation level, the controller deactivates the vacuum pump. Conversely, if the sensed vacuum pressure level is less than the deactivation level, the controller does not affect the previous state of the vacuum pump switch signal. The pump thus builds the vacuum supply back up again until the vacuum pressure level reaches the deactivation level, at which level the controller deactivates the pump by deactivating the vacuum pump switch signal. Thus, the controller functions to maintain the vacuum supply at or between the activation and deactivation levels to ensure adequate vacuum to operate the trailer brake system.

The controller is coupled to output the electric vacuum pump switch signal to a relay 41 that is coupled to the vacuum pump. The vacuum pump and its coupled relay can be positioned and mounted inside the tow vehicle's engine compartment. However, this does not exclude the possibility of the vacuum pump and relay being positioned elsewhere in the tow vehicle or on the trailer. The relay is electrically-activated and controls the vacuum pump to generate vacuum, based on the state of the vacuum pump switch signal generated by the controller. If the controller deactivates the vacuum pump switch signal, the relay is deactivated and hence the vacuum pump generates no vacuum supply. If activated by the controller, the vacuum pump switch signal assumes a state that activates the relay to activate the vacuum pump. The vacuum pump is coupled in an airtight manner to the vacuum supply used to operate the trailer brake system. In the embodiment of FIG. 1, the apparatus comprises a conduit 42 communicatively coupled between the vacuum pump and the control valve.

If the tow vehicle's engine is a diesel type, the vacuum pump is the only source of vacuum available to operate the trailer's brakes. However, if the tow vehicle's engine is an electronic fuel injection (EFI) or conventional gas-powered type, the tow vehicle will typically have a vacuum source that is insufficient to operate the trailer's brakes. The vacuum generated by such engines can be used to advantage by coupling such vacuum source to that generated by the vacuum pump. The vacuum supply generated by the engine's source and the vacuum pump can be coupled together with an additional conduit 43 that is coupled to communicate with the conduit 42 and the engine's air intake manifold in FIG. 1. As another alternative configuration, the conduit 42 can be coupled in communication with the booster 9 to provide vacuum for its second compartment to assist the driver in applying the brakes. This alternative configuration can be used with or without coupling the vacuum supply from the vacuum pump to the engine's vacuum source (if any exists).

The invented apparatus can also comprise a display 44 coupled to the controller 39. Preferably, the display is located on the tow vehicle's dashboard in a position readily visible to the driver. However, this does not exclude the possibility of the display being positioned elsewhere in the driver's compartment of the tow vehicle where it is visible to the driver. The controller periodically reads the vacuum supply level signal from the vacuum supply sensor 38, and generates a display signal indicative of the vacuum pressure level, based on the vacuum supply sensor's signal. The controller is coupled to supply the display signal to the display, to generate a visual indication to the driver of the amount of vacuum present in the supply for use in operating the trailer's brake system. The display can be a light-emitting diode (LED) display, vacuum fluorescent (VF) display, or liquid crystal display (LCD) preferably back-lit for night-driving.

The invented apparatus can also comprise an alarm 45 coupled to the controller 39. The alarm 45 is preferably situated inside the driver's compartment of the tow vehicle in proximity to the driver. The controller periodically reads the vacuum supply level signal generated by the vacuum supply sensor 38. The controller compares the sensed vacuum pressure level with a predetermined alarm level that is preprogrammed into the controller. The alarm level can be a static value and corresponds to a vacuum pressure level below which the vacuum supply can no longer be guaranteed to generate sufficient vacuum to operate the trailer brake system if the driver applies the tow vehicle's brake system. The alarm level can, however, be variable and determined by the controller based on the ambient pressure level read from the ambient pressure sensor. That is, the alarm level can be adjusted depending on the ambient pressure in which the tow vehicle/trailer combination is operating. In either case, if the vacuum pressure level is at or below the alarm level, the controller generates an alarm signal with an activated state. The controller is coupled to supply the alarm signal in its activated state to the alarm. Based on the activated alarm signal, the alarm generates an audio and/or visual alarm to alert the driver that the vacuum supply pressure may be insufficient to operate the trailer brake system so that the driver can avoid a situation in which the driver would be forced to attempt to brake the tow vehicle and trailer combination without properly operating trailer brakes. Conversely, if the controller determines that the vacuum pressure level is greater than or equal to the alarm level, the controller deactivates the alarm signal to deactivate the alarm.

The invented apparatus can also comprise a power switch 46 coupled to the controller. The power switch is preferably mounted under the tow vehicle's dashboard in a location easily accessible by the driver, although this is not to exclude the possibility that the power switch can be located elsewhere. The power switch can be operated by hand and has two states, one state that couples the tow vehicle's electrical system to power the controller, and a second state that decouples the tow vehicle's electrical system from the controller. The power switch allows the driver to activate the controller for use while towing the trailer, and to deactivate the controller when not towing the trailer.

Figure 5:
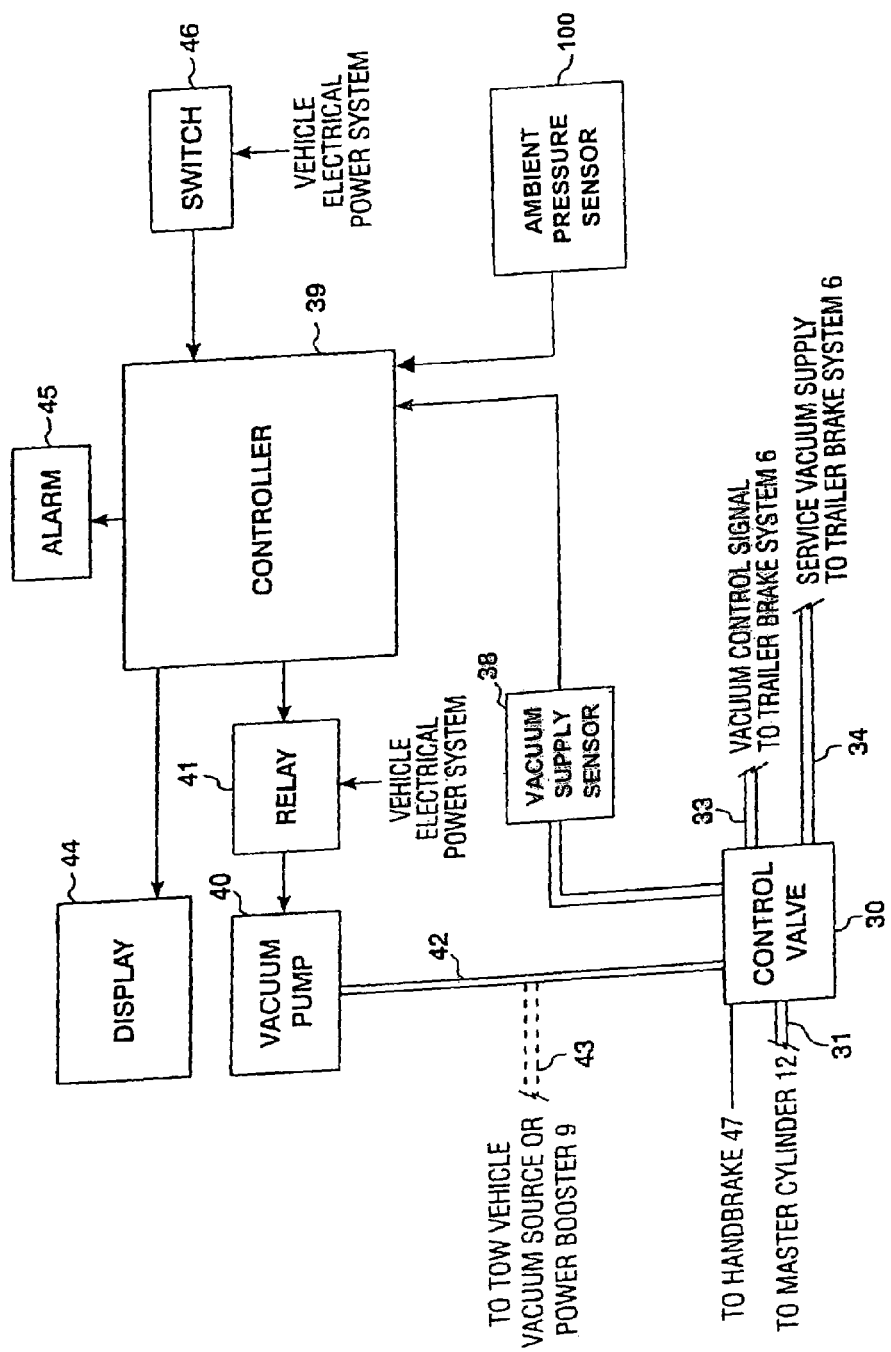
FIG. 5 is a block diagram of one embodiment of the apparatus of the present invention.

FIG. 5 is a block diagram of the invented apparatus. As described with respect to FIG. 1, the apparatus generally comprises the controller 39, but can also comprise the vacuum supply sensor 38, the vacuum pump 40, the control valve 30, and the ambient pressure sensor 100. In addition, the invented apparatus can comprise the relay 41, the conduits 42, 43, the display 44, the alarm 45, and the power switch 46. The control valve is communicatively coupled to the master cylinder 12 and the vacuum pump 40, and is coupled to the hand brake cable. The control valve is also communicatively coupled to the vacuum control line 33 and the vacuum service supply line 34 that are operatively coupled in communication with the trailer brake system. The vacuum supply sensor 38 is communicatively coupled, preferably to the control valve, to sense the vacuum supply available to the control valve to generate the vacuum supply signal and, in one embodiment, also the vacuum control signal, required to operate the trailer's brake system. The vacuum supply sensor generates an electric signal based on the sensed vacuum pressure. The vacuum supply sensor is coupled to supply the vacuum supply level signal to the controller 39.

The controller 39 is coupled to receive the vacuum supply level signal from the vacuum supply sensor 38. The controller reads the vacuum supply level signal and compares the level of the vacuum supply level signal with the activation level determined by the controller. If the level of the vacuum supply level signal is less than or equal to the activation level, the controller generates the vacuum pump switch signal with an activated state. The controller is coupled to supply the vacuum pump switch signal to the relay 41. The relay is coupled to the vacuum pump, and activates the vacuum pump, based on the activated vacuum pump switch signal. On the other hand, if the level of the vacuum supply level signal is above the activation level, the controller does not affect the previous state of the vacuum pump switch signal.

If the controller activates the vacuum pump switch signal, the controller periodically reads the vacuum supply level signal and determines whether the level of the vacuum supply level signal is at or above a deactivation level determined by the controller. The deactivation level corresponds to a vacuum pressure that is sufficiently high to ensure that the vacuum supply will be adequate to operate the trailer's brakes. Thus, as the vacuum supply pressure rises due to the operation of the vacuum pump (i.e. the absolute pressure in the vacuum supply reservoir decreases), the level of the vacuum supply level signal eventually rises to or above the deactivation level. If the controller determines that the vacuum supply level signal is at or above the deactivation level, the controller generates the vacuum pump switch signal in a deactivated state. Based on the deactivation of the vacuum pump switch signal by the controller, the relay switches the vacuum pump into a deactivated state in which it generates no further vacuum for the supply.

As previously explained, the controller 39 can implement the above-stated functions on a periodic basis, at varying intervals, or continuously, depending upon the nature of the controller, sensor, and vacuum pump. If performed on a periodic or varying interval basis, the frequency of repetition of these functions can depend upon a variety of factors that will occur to those of ordinary skill in the art, such as the geographic area in which the invented apparatus is to be operated. For example, if the tow vehicle/trailer combination is operated in mountainous regions, it may be more desirable to repeat the controller functions relatively frequently, i.e., every second or less. Conversely, if the tow vehicle/trailer combination are operated in a flat coastal region, then the repetition of controller functions can be performed less frequently, such as every ten seconds or less during operation of the tow vehicle/trailer combination. Of course, by setting the controller to repeat its functions relatively frequently, such as every second or less, the tow vehicle/trailer combination can be operated in virtually any geographic area, which eliminates the need to further be concerned with where the tow vehicle/trailer combination is operated.

The controller can be coupled to the display 44. The controller generates the display signal supplied to the display, based on the level of the vacuum supply level signal. The display can comprise a two-digit LED, VF, or back-lit LCD display in which a low numerical value indicates that the vacuum supply is relatively low, and a relatively high numerical value indicates that the vacuum supply is relatively plentiful. In addition, the controller compares the vacuum supply level signal with an alarm level. If the vacuum supply level signal indicates a level at or below the alarm level, the controller generates the alarm signal with an activated state. The controller is coupled to the alarm 45 that generates an audio or visual indication to the driver, based on the alarm signal, to indicate to the driver that the vacuum supply may be insufficient to operate the trailer brake system. Conversely, if the vacuum supply level signal is above the alarm level, the controller generates the alarm signal with a deactivated state so that the alarm generates no audio or visual indication of an alarm condition.

The controller can be coupled to the power switch 46. The power switch is coupled to the tow vehicle's electrical system. In one embodiment, the power switch can be manipulated by the driver to an 'on' position to couple the tow vehicle's electrical power system to the controller for operation, or alternatively, can be manipulated to an 'off' position to decouple the tow vehicle's electrical power system from the controller, to deactivate the controller. The controller is thus selectively powered by the power switch.

The vacuum pump 40 can be communicatively coupled through the conduit 42, to supply the vacuum generated by the pump to the control valve 30. The conduit 42 can be coupled to communicate with a vacuum source, if any, generated by the tow vehicle's engine via a conduit 43, so that the vacuum source generated by the engine can be used together with the pump to generate the vacuum supply required for operation of the trailer brake system. The conduit 42 can be used to communicatively couple the vacuum supply generated by the vacuum pump to the power booster 9 for the tow vehicle's brake system, in addition to or as an alternative for coupling the conduit 43 with any vacuum source generated by the engine.

In operation, the controller 39 is powered by the driver through manipulation of the switch 46. Upon activation, the controller reads the vacuum supply level signal generated by the vacuum supply sensor and the ambient pressure signal generated by the ambient pressure sensor. Once the controller has determined the activation and deactivation levels based on the ambient pressure sensor, the controller activates, or alternatively deactivates, the vacuum pump via the relay, based upon the vacuum supply level signal, and the activation and deactivation levels. In addition, the controller generates the display signal for the display, based on the vacuum supply level signal, to indicate to the driver the vacuum supply level available for operation of the trailer brake system. The controller also compares the vacuum supply level signal to the alarm level, and activates the alarm signal if the vacuum supply level signal is at or below the alarm level, and deactivates the alarm signal if the vacuum supply level signal is above the alarm level. The controller outputs the alarm signal to the alarm that generates an audio and/or visual indication to the driver to warn of a low vacuum supply if the controller activates the alarm signal, and that deactivates the alarm signal otherwise. The vacuum pump generates vacuum as the controller determines necessary, and is coupled to supply this vacuum to the control valve. If the driver depresses the brake pedal to stop the tow vehicle and trailer, the control valve senses the activation of the tow vehicle's brakes from increased pressure exerted by the brake fluid signal from the master cylinder 12. The control valve thus drops the vacuum level of the vacuum control signal by bleeding air into the vacuum control signal line 33 in an amount proportional to the degree to which the driver applies the tow vehicle's brakes, to proportionally activate the trailer brake system. Conversely, if the driver releases the tow vehicle brake pedal, the control valve shuts off the bleed air supply from atmosphere and couples the vacuum supply generated by the vacuum pump to the vacuum control line to evacuate the line 33, causing the trailer brake system to release its brakes. In one embodiment, the control valve couples the vacuum supply generated by the vacuum pump, as a constant supply of service vacuum to the trailer brake system.

Figure 6:
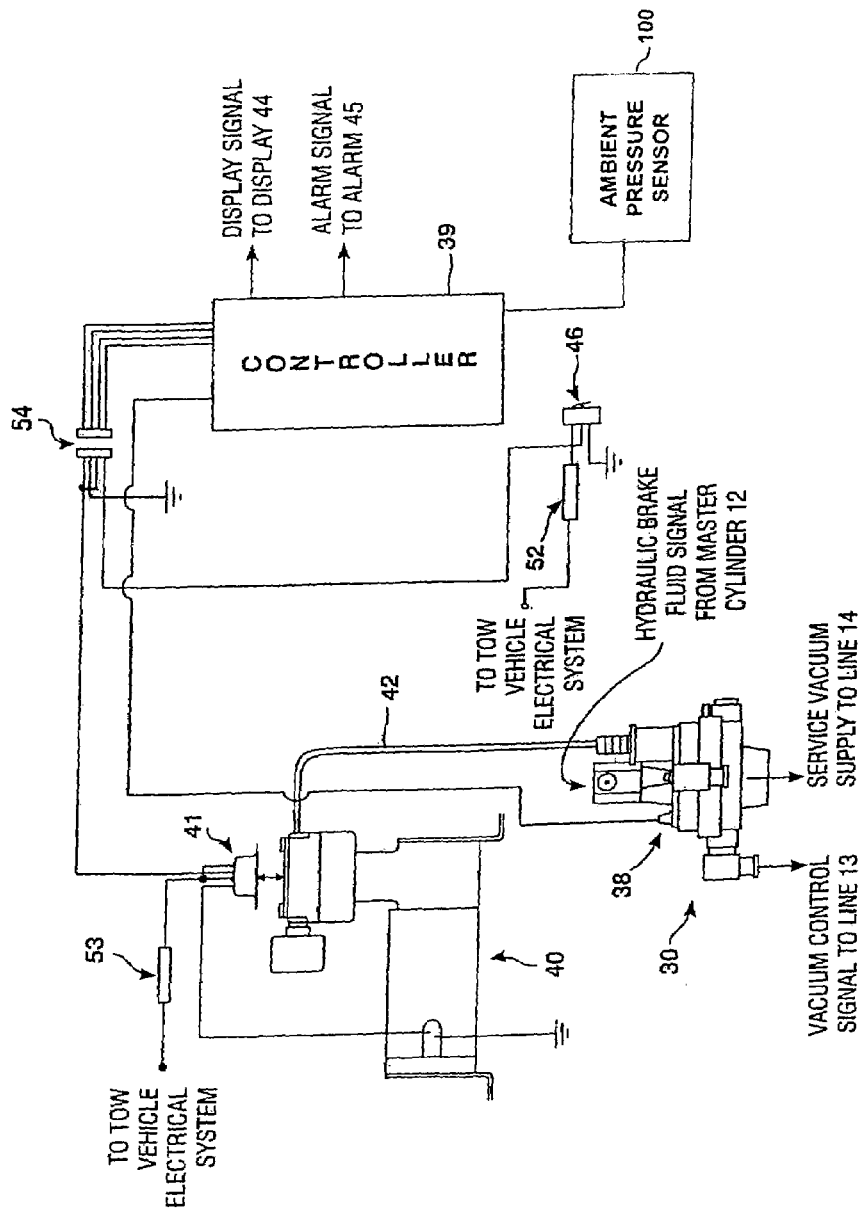
FIG. 6 is a view of various elements of one embodiment of the invented apparatus.

FIG. 6 is an exemplary configuration for the invented apparatus. The elements of the invented apparatus have been previously described with reference to FIGS. 1 and 5, so a detailed description of these elements is omitted with respect to FIG. 6 as redundant. The configuration of FIG. 6 warrants some description, however, with respect to items formerly not described. Specifically, the power switch can be coupled to the tow vehicle's electrical system through a fuse 52 to prevent damage to the tow vehicle electrical system due to an unlikely failure of the switch or controller. In addition, the relay 41 is coupled to the tow vehicle's electrical system via a fuse 53 to prevent damage to the tow vehicle electrical system due to an unlikely failure in the pump. To distinguish the relay from the vacuum pump 40, the relay is shown separated from the vacuum pump. In actuality, the relay is mounted to the vacuum pump but can also be remotely mounted to selectively supply electric power from the tow vehicle's electrical system, based on the state of the vacuum pump switch signal. If powered by the relay, the vacuum pump generates vacuum for the supply required to operate the trailer brake system. In FIG. 6, the controller is coupled to the relay, the power switch and ground (i.e., the tow vehicle's chassis) by joining together the connector 54.

Figure 7:
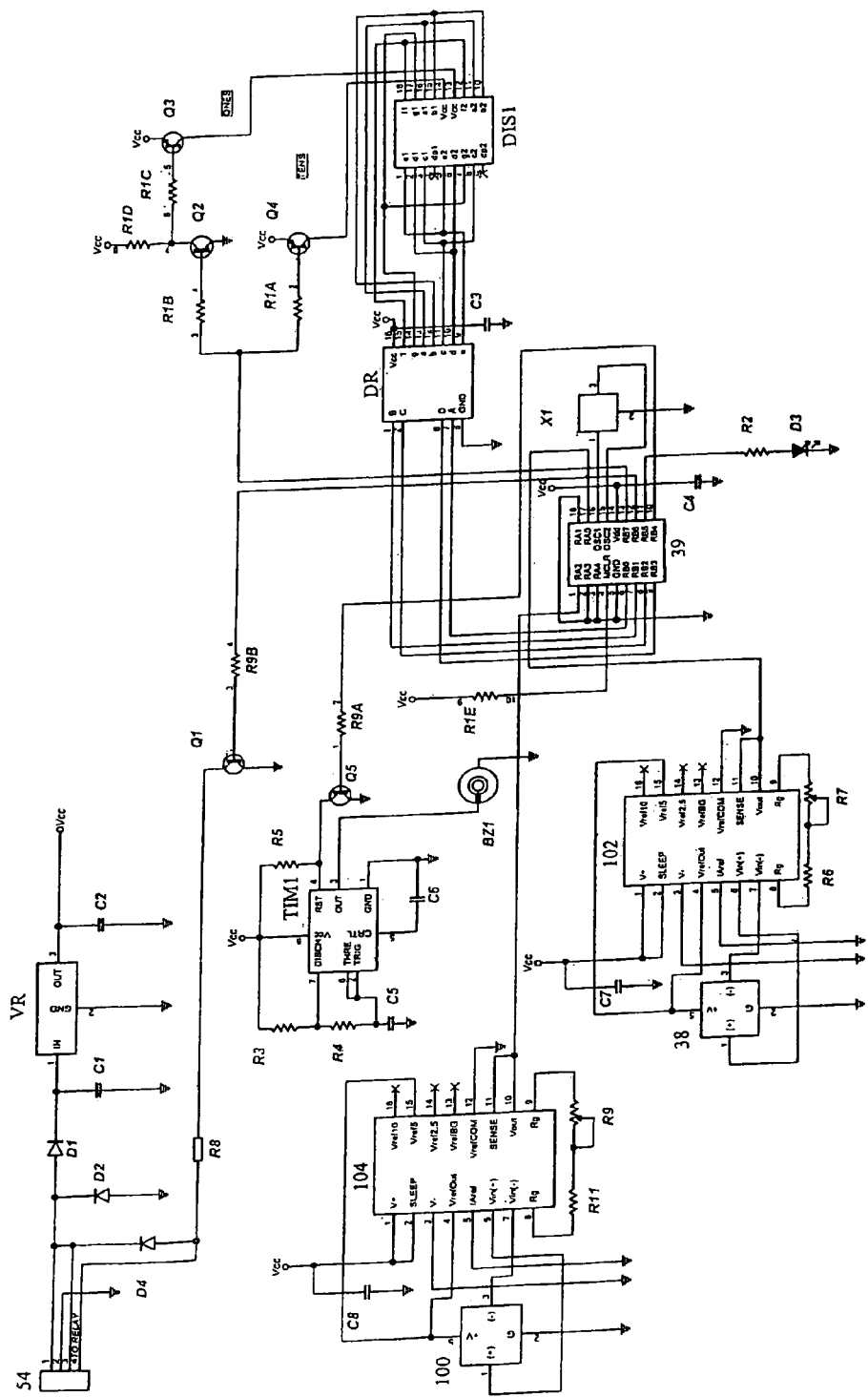
FIG. 7 is a circuit diagram of various elements of one embodiment of the invented apparatus.

In FIG. 7, the connector 54 is coupled to the tow vehicle's electrical system that supplies power to the cathode of diode D2 whose anode is coupled to ground, and the anode of diode D1 whose cathode is coupled to the input terminal of voltage regulator VR and a terminal of capacitor C1 whose opposite terminal is coupled to ground. A terminal of the voltage regulator is coupled to ground, and its output terminal is coupled to a terminal of the capacitor C2 whose opposite terminal is coupled to ground. The output terminal of the voltage regulator VR generates a voltage $V_{cc}$ that is used by several elements of the circuit of FIG. 7.

The vacuum supply sensor 38 is preferably a model no. SDX15D4, commercially available from SenSym/ICT of Milpitas, Calif. This sensor provides an output voltage signal on terminals (+), (−) that is proportional to the amount of vacuum contained in the vacuum supply. This sensor measures vacuum pressure relative to ambient air pressure. An absolute sensor such as a model no. SDX15A4, commercially available from SenSym/ICT of Milpitas, Calif., can alternatively be used. If the vacuum supply sensor comprises an absolute pressure sensor, modifications to use absolute vacuum supply pressure data are necessary such as storing deactivation and activation levels in controller memory as absolute pressure values, or calculating relative-to-ambient vacuum supply pressure data by subtracting absolute vacuum supply pressure from ambient pressure. Such modifications will be apparent to one of skill in the art. The following description applies in cases where the vacuum supply sensor comprises a relative-to-ambient vacuum supply sensor.

The ground terminal G of the vacuum supply sensor is connected to ground. The positive and negative output terminals (+), (−) of the vacuum supply sensor are connected to the $V_{in}(+)$ and $V_{in}(-)$ terminals of an instrumentation amplifier 102, respectively. The instrumentation amplifier 102 is preferably a model no. INA125P commercially available from Burr-Brown Corporation of Tucson, Ariz. The voltage supply terminal V+ of the vacuum supply sensor is connected to the $V_{ref5}$ and the $V_{refOut}$ terminals of the instrumentation amplifier 102. The V+ and SLEEP terminals of the instrumentation amplifier 102 are connected to $V_{cc}$ and to a terminal of capacitor C7. The opposite terminal of capacitor C7 is connected to ground. The V−, $IA_{ref}$, and $V_{refCOM}$ terminals of the instrumentation amplifier are connected to ground. The $V_{ref10}$, $V_{ref2.5}$, and $V_{refBG}$ terminals of the instrumentation amplifier are left floating. The two $R_g$ terminals of the instrumentation amplifier are connected by a resistor R6 and potentiometer R7 in series. The potentiometer R7 is used to set the gain of the instrumentation amplifier. The gain is set at the time of manufacture of the apparatus to output a voltage signal having a range compatible with the chosen controller 39. The instrumentation amplifier 102 therefore is used to condition the output of the vacuum supply sensor for providing the vacuum supply level signal to the controller.

The ambient pressure sensor 100 is preferably a model no. SDX15A4 commercially available from SenSym/ICT of Milpitas, Calif. This sensor has an internal vacuum reference and outputs a voltage that is proportional to the (absolute) ambient air pressure. The ground terminal G of the ambient pressure sensor is connected to ground. The positive and negative output terminals (+), (−) of the ambient pressure sensor are connected to the $V_{in}(+)$ and $V_{in}(-)$ terminals of an instrumentation amplifier 104 respectively. The instrumentation amplifier 104 is preferably a model no. INA125P commercially available from Burr-Brown Corporation. The voltage supply terminal of the ambient pressure sensor is connected to the $V_{ref5}$ and the $V_{refOut}$ terminals of the instrumentation amplifier 104. The V+ and SLEEP terminals of the instrumentation amplifier 104 are connected to $V_{cc}$ and to a terminal of capacitor C8. The opposite terminal of capacitor C8 is connected to ground. The V−, $IA_{ref}$, and $V_{refCOM}$ terminals of the instrumentation amplifier 104 are connected to ground. The $V_{ref10}$, $V_{ref2.5}$, and $V_{refBG}$ terminals of the instrumentation amplifier are left floating. The two $R_g$ terminals of the instrumentation amplifier 104 are connected by a resistor R11 and potentiometer R9 in series. The potentiometer R9 is used to set the gain of the instrumentation amplifier. The gain is set at the time of manufacture to output a voltage signal having a range compatible with the chosen controller 39. The instrumentation amplifier 104 therefore is used to condition the output of the ambient pressure sensor for providing the ambient pressure signal to the controller.

The controller 39 is preferably a model no. P1C16C71-20-IP, commercially available from Microchip Technology, Inc. of Mountain View, Calif. The controller 39 is coupled to receive the vacuum supply level signal from the $V_{out}$ and SENSE terminals of the instrumentation amplifier 102 at the controller's RA0 terminal. The controller's voltage terminal $V_{dd}$ is coupled to the voltage supply $V_{cc}$. A capacitor C4 is has one terminal coupled to the voltage terminal $V_{cc}$ and the other terminal coupled to ground. The controller's GND terminal is coupled to ground along with controller inputs RA1, RA3, and RA4. The controller's terminals OSC1, OSC2 are coupled to respective terminals designated "1", "3" of a resonator X1 that has a third terminal designated "2" that is grounded. The controller's terminal MCLR is coupled to voltage supply $V_{cc}$ through a resistor R1E. The controller outputs RB0–RB3, are coupled to respective inputs A–D of the binary-coded decimal (BCD) driver DR (such as model no. CA3161E commercially available from Harris Semiconductor Corporation, now named Intersil Corporation, Palm Bay, Fla. The controller output RB6 generates the vacuum pump switch signal, and is coupled to a terminal of resistor R9B whose opposite terminal is coupled to the base of NPN transistor Q1. The emitter of transistor Q1 is coupled to ground, and its collector is coupled to resistor R8. The opposite terminal of resistor R8 is coupled to connector 54 and to the anode of diode D4. The cathode of diode D4 is connected to the terminal(s) of connector 54 supplying power to the voltage regulator VR. Connector 54, if coupled to its second half, couples the collector of transistor Q1 to the relay 41 to activate or deactivate the vacuum pump according to the state of the vacuum pump switch signal.

The BCD driver DR has a terminal $V_{cc}$ coupled to the voltage supply $V_{cc}$, and a ground terminal GND coupled to ground. A capacitor C3 has one terminal coupled to the BCD driver's terminal $V_{sub.cc}$ and another opposite terminal coupled to ground. The BCD driver's outputs a–g are coupled to respective inputs a1, a2, b1, b2, c1, c2, d1, d2, e1, e2, f1, f2, g1, g2 of the seven-segment LED or back-lit LCD display DIS1 (such as model no. LN524RA available from Panasonic, Inc. of Japan) of the display 44. The display DIS1 has terminals dp1 and dp2 that are left floating. The controller's RB7 output signal periodically toggles between high- and low-logic states, and the controller outputs the first digit to be displayed on the display DIS1 at the high-logic state of the RB7 output signal, and the second digit to be displayed on the display D2 on the low-logic state of the RB7 output signal. The controller's RB7 output signal is coupled to a terminal of resistor RIB whose opposite terminal is coupled to a base of NPN transistor Q2. The emitter of the NPN transistor Q2 is coupled to ground. The collector of the transistor Q2 is coupled to a terminal of the resistor RID whose opposite terminal is coupled to the voltage supply $V_{cc}$. The collector of the transistor Q2 is also coupled to a terminal of resistor R1C whose opposite terminal is coupled to the base of PNP transistor Q3. The emitter of transistor Q3 is coupled to the voltage supply $V_{cc}$. The collector of transistor Q3 is coupled to a terminal $V_{cc}$ at pin 13 of the display DIS1. This $V_{cc}$ terminal corresponds to the "ones" or first digit of the BCD segments of the display. The RB7 output signal is also coupled to a terminal of resistor R1A whose opposite terminal is coupled to the base of PNP transistor Q4. The emitter of the transistor Q4 is coupled to the voltage supply $V_{cc}$, and its collector is coupled to the terminal $V_{cc}$ at pin 14 of the display DIS1 which corresponds to the "tens" or second digit of the BCD segments of the display.

If the controller's output signal RB7 is in a high-logic state, the transistor Q2 conducts, lowering the voltage at the base of transistor Q3 to render the transistor Q3 conductive. The conductive state of the transistor Q3 supplies power to the "ones" $V_{cc}$ terminal of the display DIS1 that receives and displays the first digit of the display signal output by the controller. If the controller's output signal RB7 is in a high-logic state, the transistor Q4 is non-conductive so that no power is supplied to the "tens" $V_{cc}$ terminal of the display DIS1 so that it is deactivated. Conversely, if the controller's output signal RB7 is in a low-logic state, the transistor Q2 is rendered non-conductive, causing the voltage at the base of the transistor Q3 to be in a high-logic state that renders the transistor Q3 non-conductive, thus deactivating the "ones" $V_{cc}$ terminal of the display DIS1. However, with the controller's RB7 output signal in a low-logic state, the transistor Q4 conducts so that power is supplied to the "tens" $V_{cc}$ terminal of the display DIS1 as the controller outputs the second digit of the display signal on output terminals RB0–RB3. The "tens" segments of the display DIS1 are thus powered and display the second digit of the display signal. The controller continuously alternates the power and display of the first and second digits of the display signal on the display DIS1 according to the high- or low-logic state of the controller's RB7 output signal. By alternating the display of the digits in this manner at a sufficiently fast rate, flicker of the display DIS1 that may be present is not visible to the human eye. The display DIS1 is located in a position so that it is visible to the tow vehicle's driver.

The RB5 output terminal of the controller is coupled to a terminal of the resistor R2 whose opposite terminal is coupled to a light-emitting diode that serves as the visual portion of alarm 45. By activating the RB5 output terminal, the controller generates a visual indication of a dangerous low-vacuum supply condition to the tow vehicle driver. Conversely, if the RB5 output terminal is deactivated, the light-emitting diode of the alarm 45 is extinguished to indicate that no low-vacuum supply alarm condition exists.

The RB4 output terminal of the controller is coupled to a terminal of the resistor R9A whose opposite terminal is coupled to the base of transistor Q5. The emitter of transistor Q5 is coupled to ground. The collector of transistor Q5 is coupled to the RST terminal of timer TIM1 and to a terminal of resistor R5. Timer TIM1 is preferably a model no. LM555 timer which is commercially available from a number of suppliers. The opposite terminal of resistor R5 is connected to the $V_{cc}$ voltage supplied by the voltage regulator VR. The $V_{cc}$ terminal of the timer is also connected to the $V_{cc}$ voltage supplied by the voltage regulator. One terminal of resistor R3 is coupled to $V_{cc}$. The opposite terminal of R3 is connected to resistor R4 and the DISCH terminal of timer TIM1. The opposite terminal of R4 is connected to capacitor C5 and to the THRE and TRIG terminals of the timer TIM1. The opposite terminal of capacitor C5 is connected to ground. The GND terminal of timer TIM1 is coupled to a terminal of capacitor C6 and to ground. The opposite terminal of capacitor C6 is coupled to the CRTL terminal of the timer TIM1. The OUT terminal of the timer TIM1 is connected to one terminal of buzzer BZ1, the second terminal of which is grounded. By activating the RB4 output terminal, the controller generates an audible indication of a dangerous low-vacuum supply condition to the tow vehicle driver. Conversely, if the RB4 output terminal is deactivated, the buzzer of the alarm 45 is deactivated to indicate that no low-vacuum supply alarm condition exists.

Figure 8:
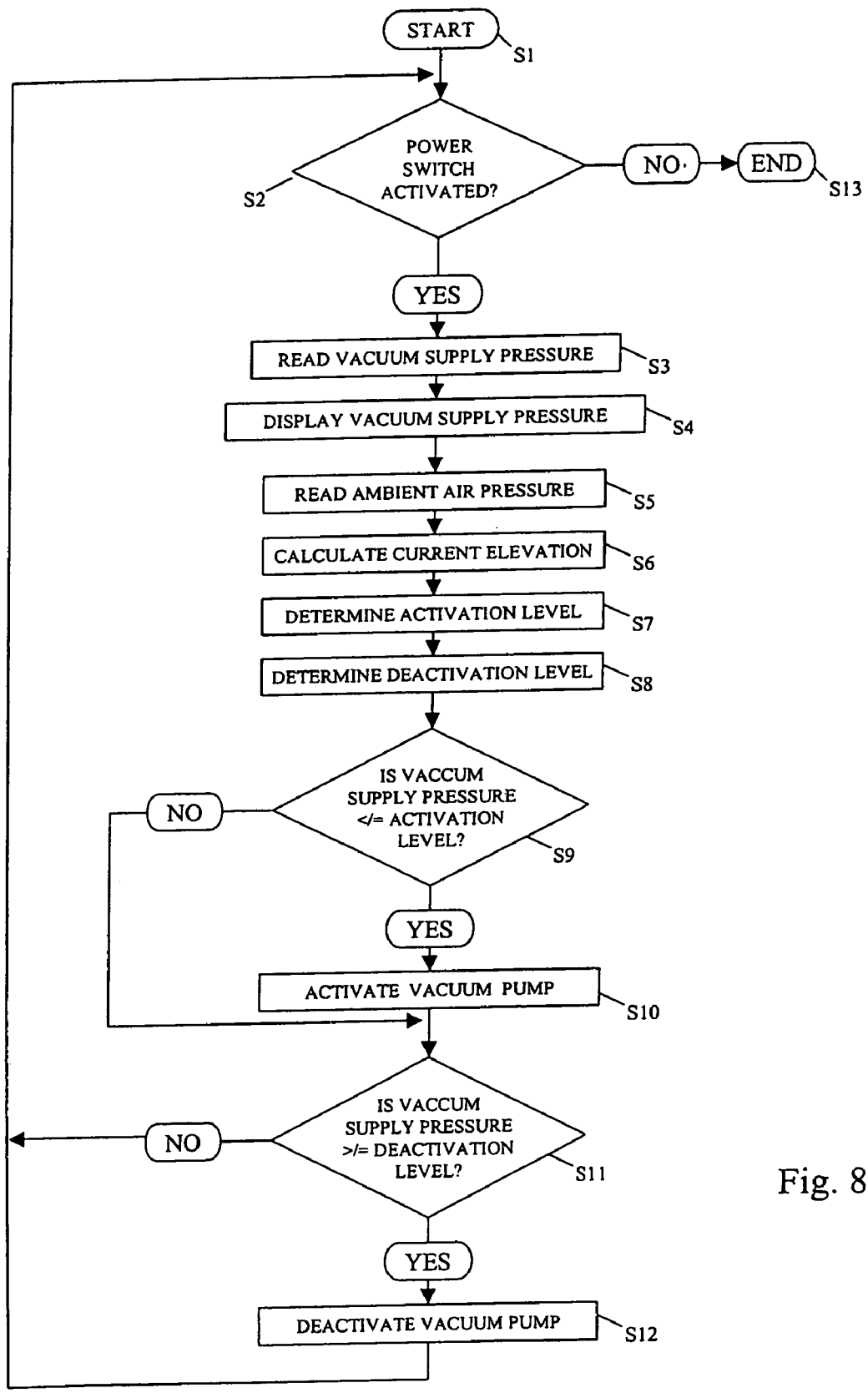
FIG. 8 is a flow chart of processing performed by a controller of the invented apparatus to ensure efficient generation of a vacuum supply.

FIG. 8 is a flowchart of processing performed by the controller to ensure an adequate vacuum supply for operation of the trailer's brake system. The processing of FIG. 8 is programmed into the controller's memory. Alternatively, such processing can be implemented in the logic circuit or gate structure of the controller if so implemented. In step S1, the processing performed by the controller begins. In step S2, the controller determines whether the power switch is activated. In actuality, the controller cannot function unless the power switch has been activated, but step S2 is intended to indicate that the controller performs monitoring and replenishment of the vacuum supply for the trailer brake system on an ongoing basis, as long as power is supplied to the controller. In step S3, the controller reads the vacuum supply level signal generated by the vacuum supply sensor 38 (supplied to the controller by the instrumentation amplifier 102.) In step S4, the controller generates a display signal based on the vacuum supply signal. More specifically, the controller generates a two-digit digital signal for display on the display 44. The controller generates the toggle signal on its RB7 output terminal. If the toggle signal has a high-logic state, the controller outputs the display signal with the digit for the display DIS1 to the BCD driver DR that generates the "ones" or first, least significant digit segments for display on the display DIS1. Conversely, if the toggle signal has a low-logic state, the controller outputs the display signal with the digit for the display DIS1 to the BCD driver DR that generates the "tens" or second, most significant digit segments for display on the display DIS1. The controller continues to display the latest vacuum pressure level reading until the controller takes a subsequent reading. The toggle signal can change its state sufficiently frequently that the digits of the display appear constantly illuminated without flicker to the human eye. Generally, this would require the frequency of the toggle signal to be about fifty Hertz or higher.

In step S5, the controller reads the ambient pressure signal generated by the ambient pressure sensor 100 supplied to the controller by the instrumentation amplifier 104. In step S6 the controller calculates the current elevation of the trailer/tow vehicle combination based on the ambient pressure read in step S5. At steps S7 and S8 the controller determines the activation and deactivation levels. It should be understood that that one of steps S5 and S6 can optionally be omitted from the method. For example, the activation and deactivation levels can be determined using data such as that shown in FIG. 3. Alternatively, the step of reading the ambient pressure could be omitted where the controller is able to read elevation information from a sensor that outputs elevation information without requiring a pressure reading. A GPS receiver is an example of such a device.

The activation and deactivation levels determined in steps S7 and S8 can be found, for example, by reading or "looking up" data from a "lookup table" stored in the controller's memory. With data such as that of FIG. 3 stored in the controller's memory, the controller can search its memory for the data point having an elevation or ambient pressure nearest to that of the current elevation or ambient pressure reading. Then the controller can retrieve the corresponding activation and deactivation levels from memory and use these levels to control the operation of the vacuum pump. It should be understood that the data is not necessarily stored as depicted in FIG. 3. Separate areas of memory can be used, for example, to store elevation matched to activation levels and elevation matched to deactivation levels. Ambient pressure matched to activation levels, ambient pressure matched to deactivation levels, and/or ambient pressure matched elevation can be stored in separate memory areas as well. Additionally, each of the categories of data shown in FIG. 3 are not required. For example, one of ambient pressure or elevation can be omitted if the controller is programmed, for example, to determine activation and deactivation levels based on ambient pressure or elevation alone. Also, in embodiments using a static activation level, the activation level data can be omitted.

Other methods of determining the activation and deactivation levels are within the scope of the invention. Such methods comprise using a mathematical expression to calculate the activation and/or deactivation levels from ambient pressure or elevation. If vacuum pump performance data is known across a range of operating pressures the performance of the pump as well as desired activation and deactivation levels can be modeled as a function of ambient pressure (or elevation). Such functions can be stored in the controller's memory. The activation and deactivation levels can then be calculated using these functions by the controller as ambient pressure from a known ambient pressure or elevation. Mathematical functions can also be used to determine elevation from ambient pressure and vice versa. Determining the activation and deactivation levels in this way, however, can require a faster or more complex controller to perform the necessary calculations and raise the cost of producing the apparatus. For this reason the look up table procedure mapping an input variable (e.g., ambient pressure, altitude, and/or GPS coordinate) to an output variable (e.g., activation and/or deactivation levels) described above is currently preferred.

Once the activation and deactivation levels have been determined, the method proceeds to step S9 in which the controller determines whether the vacuum pressure level indicated by the vacuum supply level signal, is less than or equal to the activation level. If the determination in step S9 is negative, control proceeds to step S11. Conversely, if the vacuum pressure indicated by the vacuum supply level signal is less than or equal to the activation level, in step S10, the controller activates the vacuum pump switch signal on the output terminal RB6 that renders transistor Q1 conductive and hence that activates the relay 41 coupled to connector 54. The relay activates the vacuum pump to generate vacuum for the supply used to operate the trailer's brake system. In the preferred configuration, the vacuum pump generates vacuum on the conduit 42 that is supplied to the control valve 30, and optionally, is communicatively coupled to the tow vehicle vacuum source or the power booster 9 via conduit 43. In step S11 the controller determines whether the vacuum pressure indicated by the vacuum supply level signal is greater than or equal to the deactivation level determined in step S8. If the vacuum pressure level is greater than or equal to the deactivation level, in step S12 the controller deactivates the vacuum pump switch signal generated at output terminal RB6. The deactivated state of the vacuum pump switch signal renders the transistor Q1 non-conductive, and likewise deactivates the relay so that the vacuum pump generates no further vacuum supply. After performance of step S12, control returns to step S2. Conversely, in step S111, if the vacuum pressure level is less than the second predetermined level, control proceeds to step S2. Preferably, the controller performs each step in a fraction of a second so that vacuum can be quickly restored to operate the trailer brake system should it become depleted through normal use of the tow vehicle and trailer brake systems, although this does not exclude possibility of performance of the steps in any amount of time sufficient to ensure an adequate supply of vacuum for braking in which overuse of the vacuum pump is reduced or eliminated. The controller continues to perform steps S2 through S12 until the power switch is deactivated in step S2 to end the controller's processing in step S13.

Figure 9:
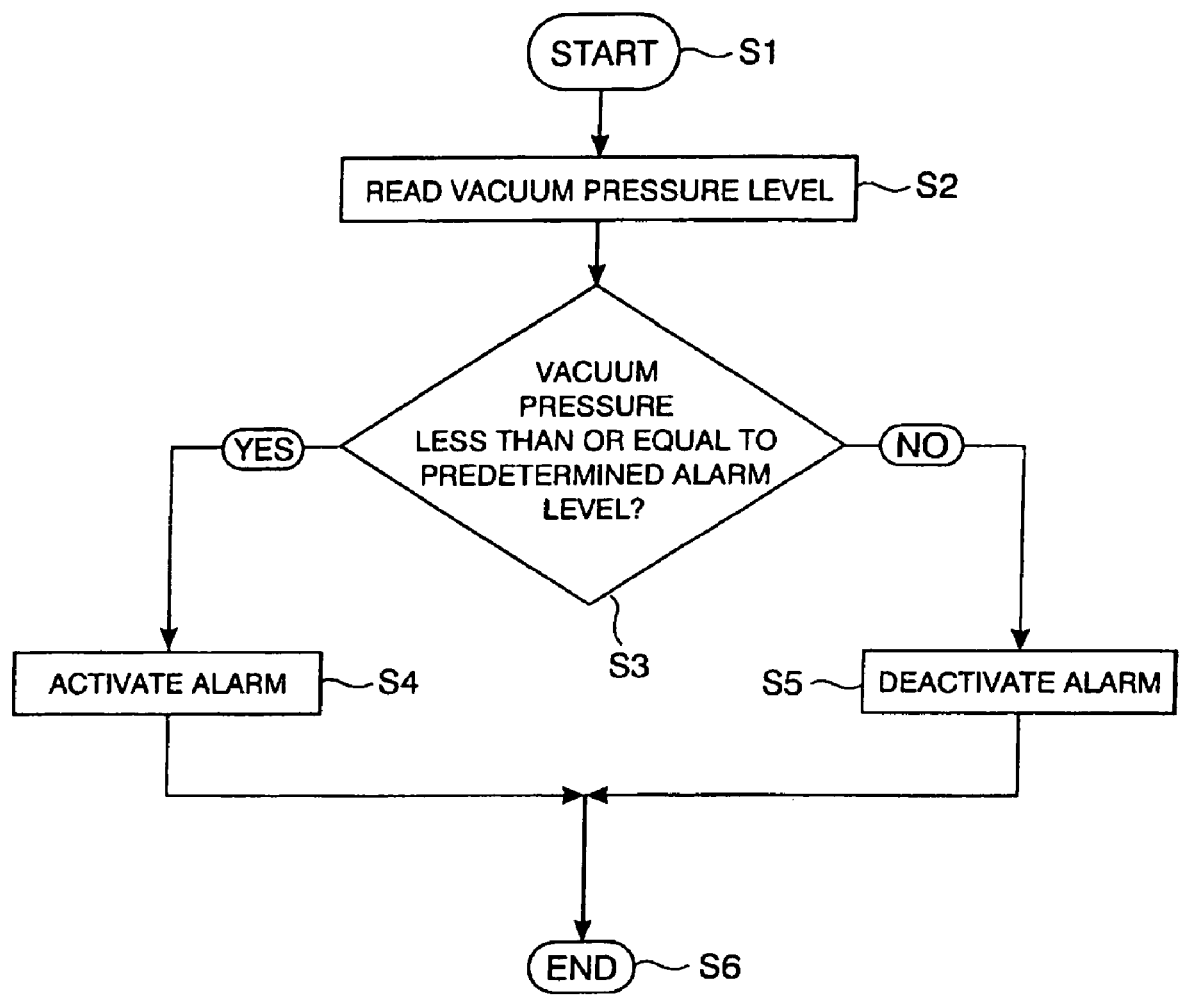
FIG. 9 is a flow chart of processing performed by the controller to generate an alarm to warn of a low-vacuum condition in the trailer brake system.

FIG. 9 is a flow chart of processing performed by the controller to determine whether the vacuum pressure level is adequate to operate the trailer brake system, and, if not, to warn the driver of the potentially dangerous low-vacuum condition. In step S1, the processing of FIG. 9 starts. In step S2, the controller reads the vacuum supply level signal to determine the vacuum pressure level of the vacuum reservoir. If the vacuum pressure level is less than or equal to the alarm level stored in the controller's memory (or alternatively determined by the controller based on the ambient conditions in which the system is operating), the controller activates the alarm signal on its RB5 output terminal and on its RB4 output terminal to activate the alarm 45. The alarm can be a visual indication such as the LED of FIG. 7 and/or can be an audio alarm such as the buzzer BZ1 of FIG. 7. Conversely, in step S3, if the vacuum pressure level is greater than the predetermined alarm level, the controller generates the alarm signal on its RB5 terminal so as to deactivate the alarm 45 in step S5. After performing one of steps S4 and S5, the processing of FIG. 9 terminates in step S6. Preferably, the steps of the processing of FIGS. 8 and 9 are alternated through the use of standard interrupts or processed simultaneously as multiple code threads, for example, so that the controller monitors and controls the vacuum supply, and also generates the alarm, if necessary, within a reasonably short period of time, preferably less than one second, from occurrence of a dangerous low-vacuum condition.

Figure 10:
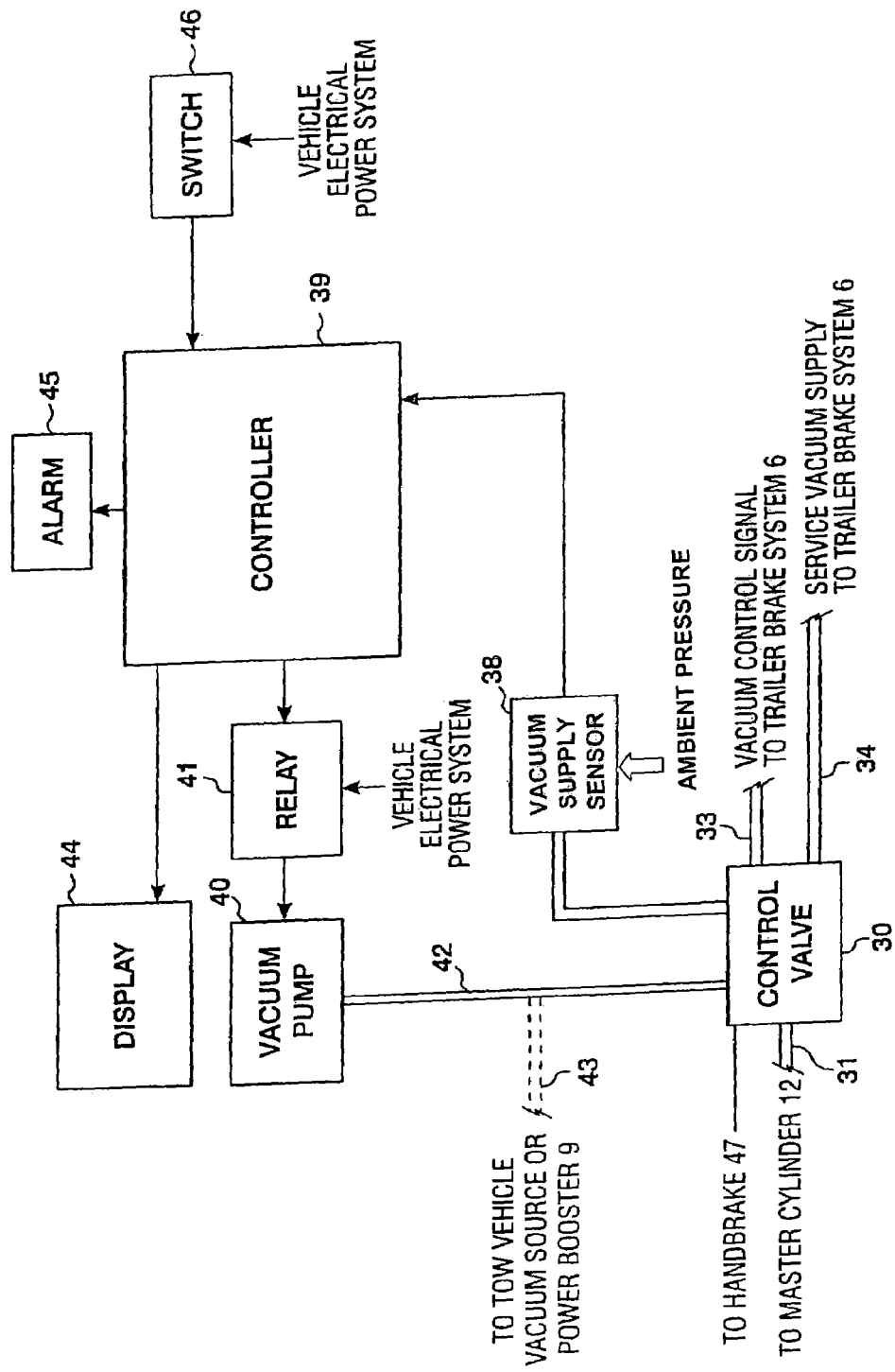
FIG. 10 is a block diagram on an embodiment of the present invention incorporating an absolute pressure sensor as the vacuum supply sensor.

FIG. 10 shows a general block diagram of an alternate embodiment of the invention. In this embodiment, the ambient pressure sensor 100 is omitted. Also in this alternative embodiment the vacuum supply sensor 38 comprises an absolute pressure sensor such as a model no. SDX15A4 commercially available from SenSym/ICT of Milpitas, Calif. (instead of the relative-to-ambient sensor generally used in the previously described embodiment.) This sensor has an internal vacuum reference and outputs a voltage that is proportional to the (absolute) ambient air pressure. In this embodiment the vacuum supply level signal provided to the controller is proportional to the absolute pressure level of the vacuum supply. The activation level and the deactivation level are both predetermined static values in this embodiment and are absolute pressure level values. The activation level, for example, can be set at 12"Hg absolute, and the deactivation level, for example, can be set at 6"Hg absolute. This embodiment is useful in cases where the vacuum pump used is known to be capable of creating a relatively consistent maximum absolute vacuum supply throughout a range of ambient air pressures in which it operates. A circuit diagram for this embodiment would resemble that of FIG. 7 except that instrumentation amplifier 104, ambient pressure sensor 100, resistor R11, potentiometer R9, capacitor C8, and associated wiring would be omitted. Also, in this embodiment, steps S5, S6, S7, and S8 can be omitted from the flowchart shown in FIG. 8 so that step S4 proceeds directly to step S9.

Figure 11:
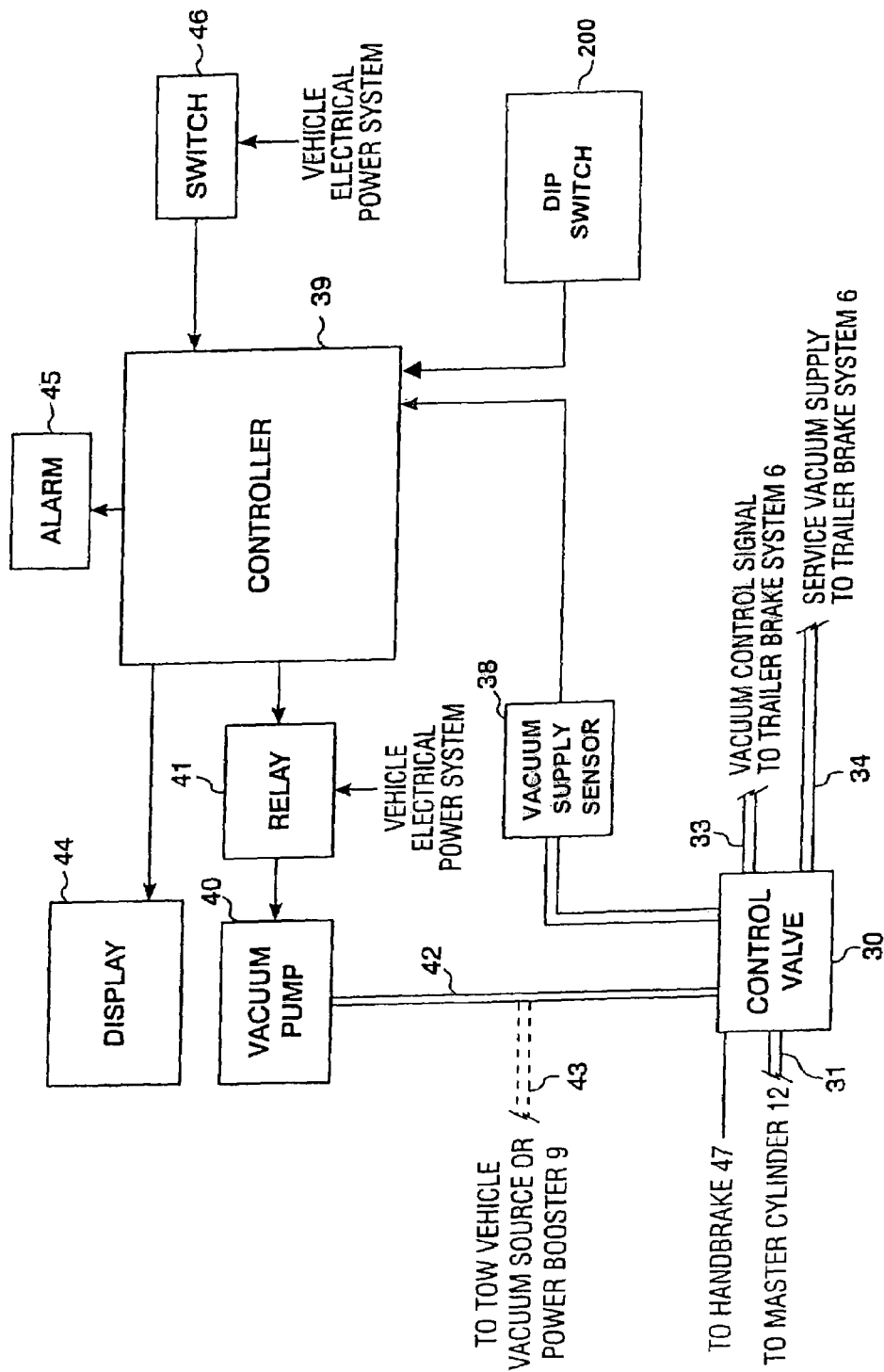
FIG. 11 is a block diagram of an embodiment of the present invention incorporating a switch to select a deactivation level.
Figure 12:
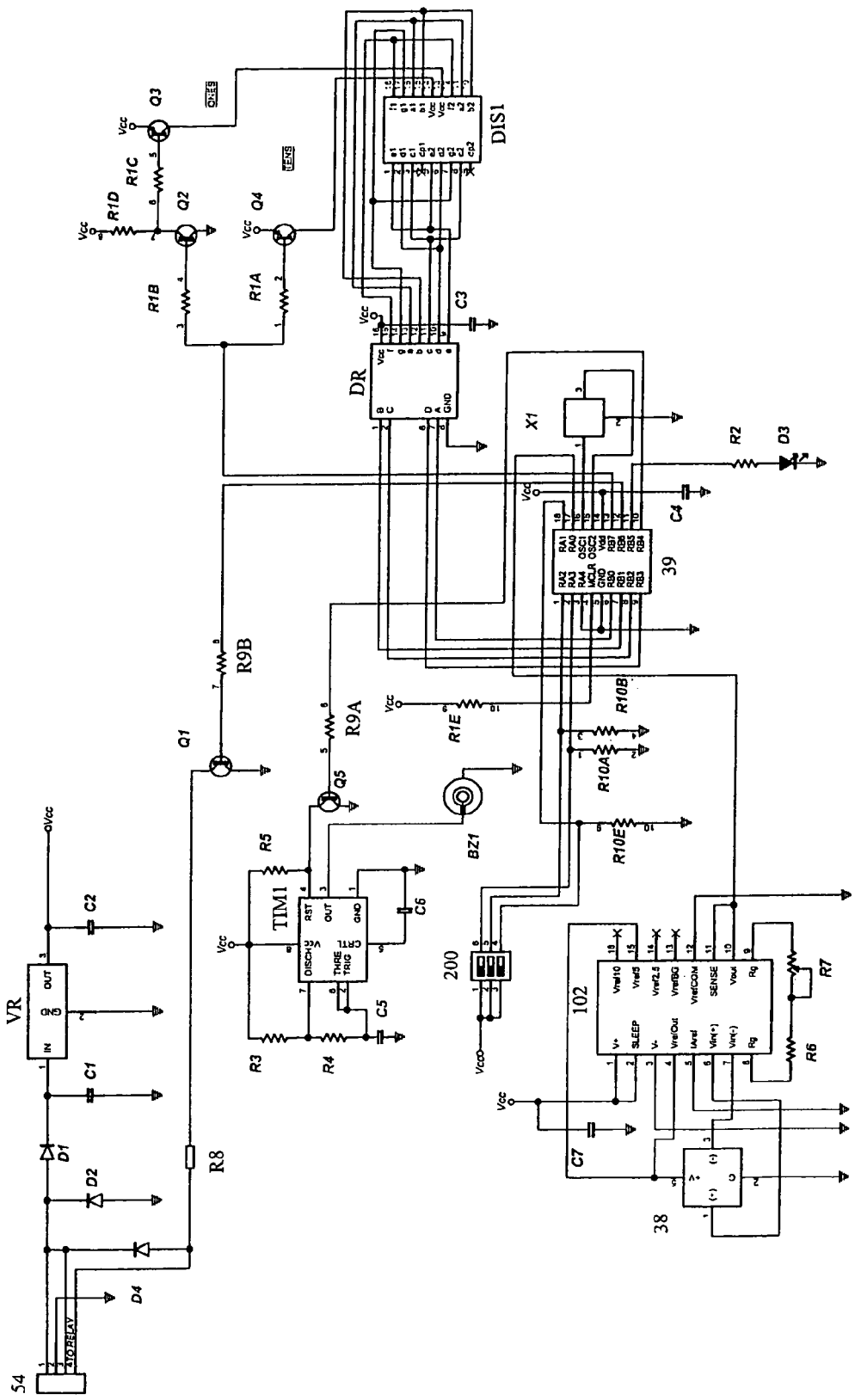
FIG. 12 is a circuit diagram of an embodiment of the present invention incorporating a switch to select a deactivation level.
Figure 15:
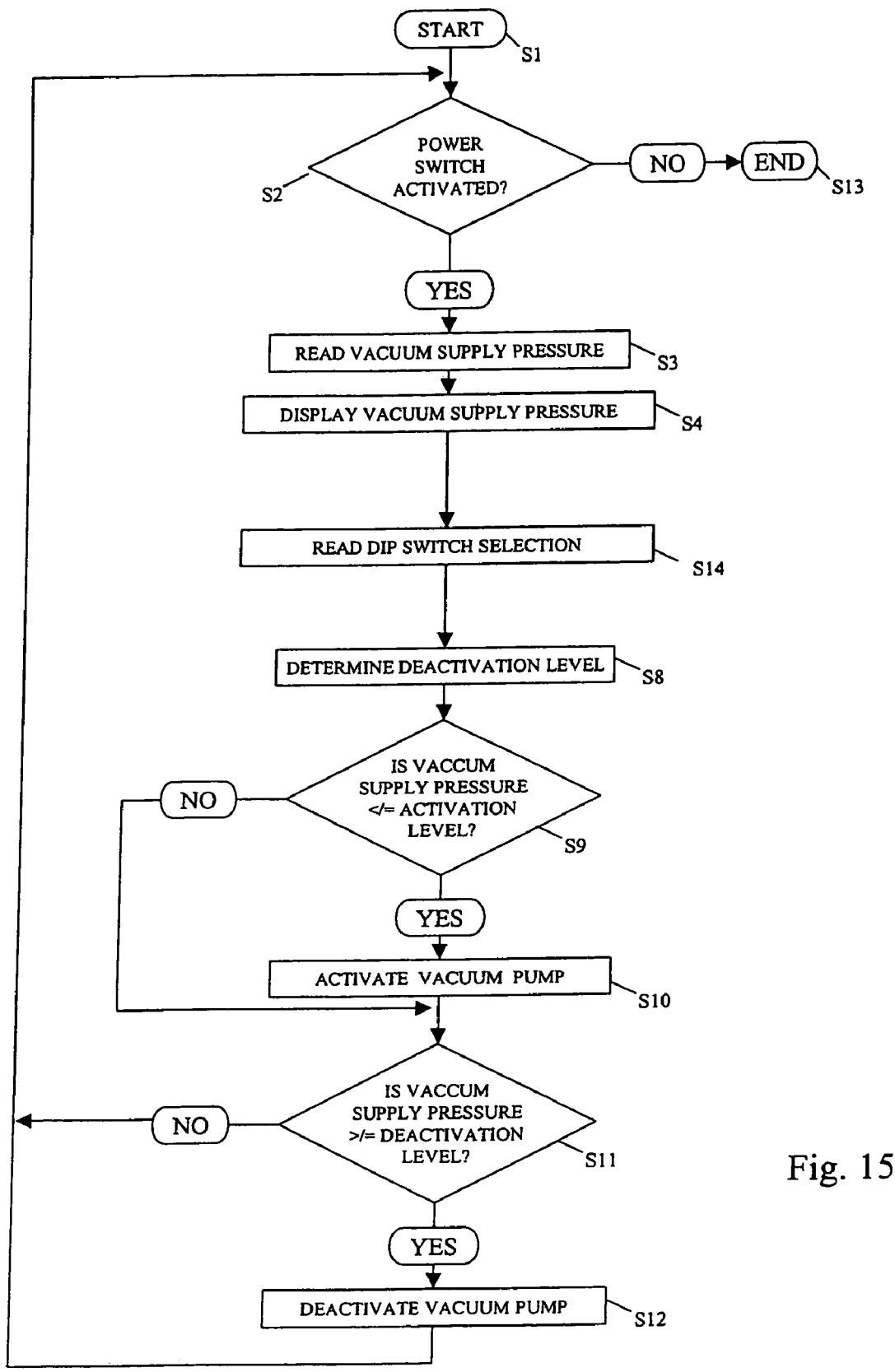
FIG. 15 is a flow chart of processing performed by a controller of the invented apparatus to ensure efficient generation of a vacuum supply when using DIP switches to set the deactivation level.

FIG. 11 shows a general block diagram of another alternative embodiment of the invention. In this embodiment the ambient pressure sensor 100 is omitted and a set of dual inline package (DIP) switches are instead connected to the controller. In this embodiment the activation level is static and a number of deactivation levels are stored in the controller's memory. The switches can be used to select one of the deactivation levels for use by the controller in maintaining the vacuum supply. The switches can be set by a user of the brake system to prevent the vacuum pump from running continuously at higher elevations (lower ambient pressures). A circuit diagram of this embodiment is depicted in FIG. 12. The circuit shown in FIG. 12 resembles that of FIG. 7 except instrumentation amplifier 104, ambient pressure sensor 100, resistor R11, potentiometer R9, capacitor C8, and associated wiring are be omitted, and terminals 4–6 of DIP switch 200 are connected the RA1, RA2, and RA3 terminals of the controller as shown. Terminals of resistors R10E, R10B, and R10A connect to terminals RA1, RA2, and RA3, respectively. The opposite terminals of these resistors connect to ground. Terminals 1–3 of the DIP switch 200 are connected to V.sub.cc. Also, in this embodiment, steps S5, S6, and S7 can be omitted from the flowchart shown in FIG. 8, and a step S14 added to the process wherein the controller reads the input states of terminals RA1–RA3 to determine which stored deactivation level to use in step S8. The flowchart shown in FIG. 15 depicts this new process. As can be seen in FIG. 15, the steps S5, S6, and S7 of FIG. 8 have been removed and replaced by step S14. In step S14 the controller reads the input states of terminals RA1–RA3. These input states can be set by manipulation of DIP switch 200. After Step S14, processing continues to step S9 and proceeds as described above regarding FIG. 8.

Figure 13:
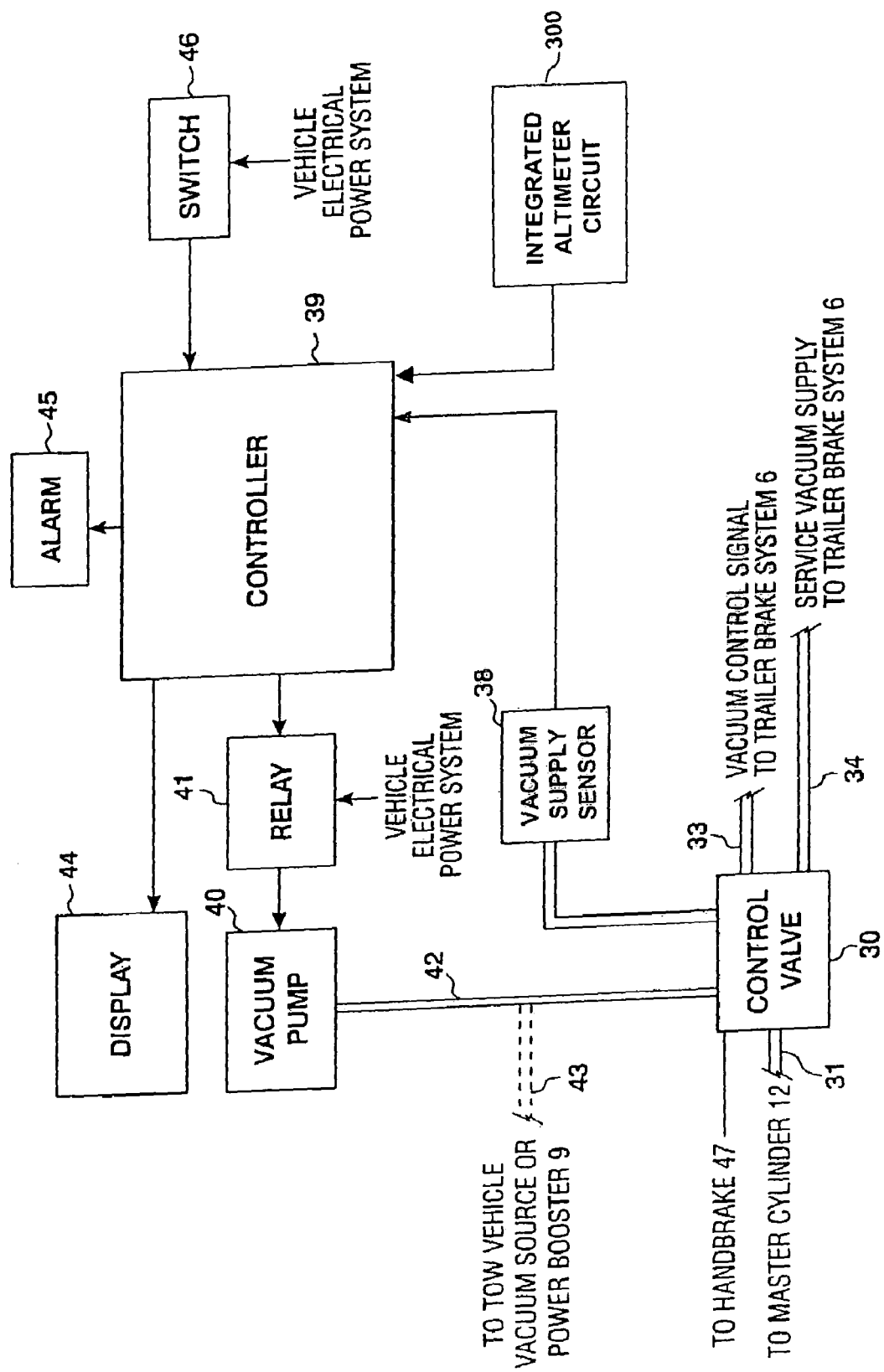
FIG. 13 is block diagram of an embodiment of the invention incorporating an integrated altimeter circuit.
Figure 14:
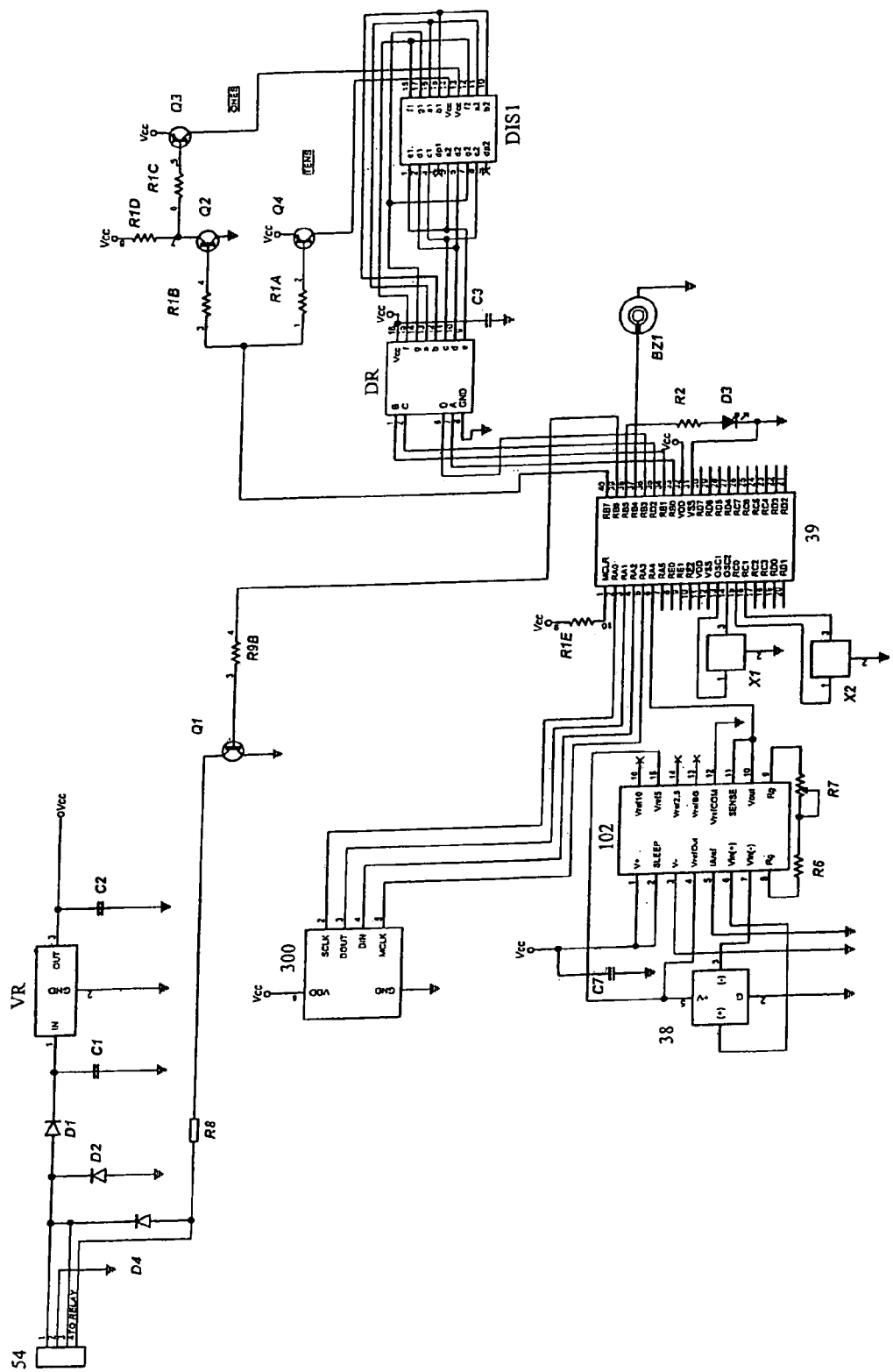
FIG. 14 is a circuit diagram of an embodiment of the invention incorporating an integrated altimeter circuit.

FIG. 13. shows a general block diagram of yet another alternative embodiment of the invention. In this embodiment an integrated altimeter circuit 300 replaces the ambient pressure sensor 100. A circuit diagram of this embodiment is shown in FIG. 14. In this embodiment controller 39 is preferably an 8-bit microcontroller such as a model no. PIC16F877 microcontroller. The integrated altimeter circuit 300 is preferably a model no. MS5534A commercially available from Intersema Sensoric S.A. of Switzerland. This integrated circuit contains an absolute pressure sensor, a temperature sensor, and analog-to-digital converter, and a microprocessor in one package and allows for the design of a highly accurate solid-state altimeter. It communicates to the controller 39 via a three-wire digital interface and provides a 16-bit data word representing the current pressure and temperature. It also provides six readable coefficients for highly accurate software calibration of the sensor. Altitude can be determined by the microcontroller by measuring the current ambient pressure and temperature, using the stored calibration data to determine a compensated pressure and temperature value, and the microcontroller uses these values to calculate the current altitude. As can be seen in FIG. 14, terminal MCLR of the controller 39 (a PIC16F877 in this embodiment) is connected to resistor R1E whose opposite terminal is connected to V.sub.cc. The VDD terminal (pin 32) of the controller is also coupled to V.sub.cc. Terminal VSS (pin 31) of the controller is connected to ground. Terminals RA5, RE0, RE1, RE2, VDD (pin 11), VSS (pin 12), RC2, RC3, RD0, RD1, RD7, RD6, RD5, RD4, RC7, RC8, RC5, RC4, RD3, and RD2 are left floating. Terminals OSC1 and OSC2 are coupled to respective terminals of oscillator X1 which has a third terminal connected to ground. Terminals RC0 and RC1 are coupled to respective terminals of oscillator X2 which has a third terminal connected to ground. The vacuum supply level signal provided by the vacuum supply sensor 38 via the instrumentation amplifier 102 on terminals V.sub.out and SENSE is supplied to the RA4 terminal of the controller. In this embodiment the vacuum supply sensor comprises a relative-to-ambient pressure sensor. An absolute sensor can alternatively be used. If the vacuum supply sensor comprises an absolute pressure sensor, modifications to use absolute vacuum supply pressure data are necessary such as storing deactivation and activation levels in controller memory as absolute pressure values. Such modifications will be apparent to one of skill in the art. Buzzer BZ1 is connected to terminal RB4 of the controller. The opposite terminal of the buzzer is connected to ground. By activating terminal RB4 the controller can cause the buzzer to sound to audibly indicate an alarm condition. One terminal of the resistor R2 connects terminal RB5 of the controller, and the other terminal of such resistor connects to a terminal of the LED D3. The opposite terminal of the LED is connected to ground. By activating an alarm signal on the terminal RB5 the controller can cause the LED to light to visibly indicate an alarm condition indicating that the vacuum supply is dangerously low. Conversely, by deactivating the signal on the terminal RB5, the controller extinguishes the LED to indicate that no alarm condition exists. The ground terminal GND of the integrated altimeter circuit 300 is coupled to ground and the VDD terminal is connected to V.sub.cc. The SCLK, DOUT, DIN, and MCLK terminals of the integrated altimeter circuit 300 are coupled to respective terminals RA0, RA1, RA2, and RA3 of the controller 39. Terminals RB0, RB1, RB2, RB3 of the controller 39 are coupled to the A, B, C, D input terminals, respectively, of the BCD driver DR. Terminal RB7 of the controller outputs a toggle signal to the resistors R1B and R1A to alternately activate the two seven-segment digits of the LED or LCD DIS1. The controller outputs the vacuum pump switch signal a terminal RB6 which is coupled to resistor R9B, transistor Q1, resistor R8, and connector 5 to supply such signal to the relay 41 to activate or deactivate the vacuum pump 400 based on the state of such signal as determined by the controller 39.

In yet another embodiment, a global positioning system (GPS) receiver is used to determine the current elevation of the trailer/tow vehicle combination. GPS receivers can use signals transmitted from a number of satellites orbiting the Earth to determine the position of the receiver. The receivers can determine latitude, longitude, as well as elevation and provide a location signal indicative or one or more of these values. In this embodiment at least elevation data or data from which elevation can be derived is supplied by the GPS receiver to the controller 38. Using this elevation data, the controller can then determine the activation and deactivation levels for vacuum pump operation according to a methods described above.

Moreover, the controller can be such as to directly map an input variable(s) such as GPS coordinates including longitude and latitude from a GPS device, directly to altitude-compensated activation and/or deactivation levels to control activation and deactivation of the vacuum pump to generate a vacuum supply to provide braking power to a trailer brake system. Thus, if the GPS receiver used is not capable of generating a direct indication of elevation for particular GPS coordinates, the controller can be programmed or configured to generate corresponding altitude-compensated activation and deactivation levels, such as by reading these level from its memory. Alternatively, if the controller is implemented as a logic circuit or gate structure, the correspondence between the GPS coordinates and the activation and deactivation levels can be "hardwired" into the controller.

Although the tow vehicle shown in FIG. 1 is a utility truck and the trailer has a particular configuration, the tow vehicle and trailer of FIG. 1 are representative only, and other types of tow vehicles and/or trailers can be used without departing from the scope of this invention. For example, the invented apparatus and method can readily be applied to vacuum-over-hydraulic tag axle brake systems in motor homes.

Furthermore, rather than being electrically-based, it should be understood that the sensor(s), controller, and possibly other elements disclosed herein can operate by using or generating optical or wireless signals without departing from the scope of the invention using embodiments similar to those described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for use with brake systems of a tow vehicle and a trailer towed by the tow vehicle, the apparatus comprising:
   a vacuum supply sensor coupled to sense a vacuum supply of the trailer brake system, and generating a vacuum supply level signal based on a pressure of the vacuum supply;
   an ambient pressure sensor generating an ambient pressure signal; and
   a controller coupled to the vacuum supply sensor and to the ambient pressure sensor, the controller generating a vacuum pump switch signal based on the vacuum supply level signal and the ambient pressure signal.

2. The apparatus of claim 1 further comprising:
   a vacuum pump coupled to the controller, and generating vacuum for the supply based on the vacuum pump switch signal.

3. The apparatus of claim 1 wherein the controller is programmed to determine a deactivation level for the vacuum pump switch signal.

4. The apparatus of claim 3 wherein the controller is further programmed to deactivate the vacuum pump switch signal from an activated state if the vacuum supply level signal represents a value that is equal to or greater than the deactivation level.

5. The apparatus of claim 3 wherein the controller is further programmed to determine the deactivation level by retrieving a value from its memory based on the ambient pressure signal, at least two different values for corresponding deactivation levels being stored in the memory.

6. The apparatus of claim 3 wherein the controller is further programmed to determine the deactivation level by retrieving a value from memory based on a current elevation of the trailer brake system, at least two different values for corresponding deactivation levels being stored in the computer readable memory, the elevation of the apparatus and associated tow vehicle and trailer being determined from the ambient pressure signal.

7. The apparatus of claim 3 wherein the controller is further programmed to determine the deactivation level by performing a calculation based on the ambient pressure signal.

8. The apparatus of claim 7 wherein the calculation comprises an estimation of the current elevation of the trailer brake system based on the ambient pressure signal.

9. The apparatus of claim 1 wherein the controller is programmed to determine an activation level for the vacuum pump switch signal.

10. The apparatus of claim 9 wherein the controller is programmed to activate the vacuum pump switch signal from a deactivated state if the vacuum supply level signal represents a value that is equal to or less than the activation level.

11. The apparatus of claim 9 wherein the controller is further programmed to determine the activation level by retrieving a value from its memory based on the ambient pressure signal, at least two different values for corresponding activation levels being stored in the memory.

12. The apparatus of claim 9 wherein the controller is further programmed to determine the activation level by retrieving a value from memory based on an elevation of the trailer brake system, the elevation being determined from the ambient pressure signal.

13. The apparatus of claim 9 wherein the controller is further programmed to determine the activation level by performing a calculation based on the ambient pressure level signal.

14. The apparatus of claim 13 wherein the calculation comprises an estimation of the elevation of the trailer brake system based on the ambient pressure signal.

15. The apparatus of claim 1 wherein the vacuum supply sensor measures vacuum pressure relative to ambient air pressure, and the ambient pressure sensor measures absolute pressure.

16. The apparatus of claim 1 wherein the vacuum supply sensor and the ambient pressure sensor measure absolute pressure.

17. An apparatus for use with brake systems of a tow vehicle and a trailer towed by the tow vehicle, the apparatus comprising:
   an absolute pressure sensor coupled to sense a vacuum supply of the trailer brake system, and generating an absolute vacuum supply level signal based on an absolute pressure of the vacuum supply; and
   a controller coupled to the absolute pressure sensor, and generating a vacuum pump switch signal based on the vacuum supply level signal, the controller being programmed to activate the vacuum pump switch signal from a deactivated state when the vacuum supply signal level is less than or equal to a predetermined activation level, and further programmed to deactivate the vacuum pump switch signal from an activated state when the vacuum supply signal level is greater than or equal to a predetermined deactivation level.

18. An apparatus for use with brake systems of a tow vehicle and a trailer towed by the tow vehicle, the apparatus comprising:
   a vacuum supply sensor coupled to sense a vacuum supply of the trailer brake system, and generating a vacuum supply level signal based on a pressure of the vacuum supply;
   a GPS receiver generating a location signal representing a location of the trailer brake system;
   a controller coupled to the vacuum supply sensor and to the OPS receiver, the controller generating a vacuum pump switch signal based on the vacuum supply level signal and the location signal.

19. The apparatus of claim 18 further comprising:
a vacuum pump coupled to the controller, and generating vacuum for the supply based on the vacuum pump switch signal.

20. The apparatus of claim 18 wherein the controller is programmed to determine a deactivation level for the vacuum pump switch signal.

21. The apparatus of claim 20 wherein the controller is further programmed to deactivate the vacuum pump switch signal from an activated state if the vacuum supply level signal represents a value that is equal to or greater than the deactivation level.

22. The apparatus of claim 20 wherein the controller is further programmed to determine the deactivation level by retrieving a value from its memory based on the location signal, at least two values being stored in the computer readable memory.

23. The apparatus of claim 20 wherein the controller is further programmed to determine the deactivation level by performing a calculation based on the location signal.

24. The apparatus of claim 18 wherein the controller is programmed to determine an activation level for the vacuum pump switch signal.

25. The apparatus of claim 24 wherein the controller is programmed to activate the vacuum pump switch signal from a deactivated state if the vacuum supply level signal represents a value that is equal to or less than the activation level.

26. The apparatus of claim 24 wherein the controller is further programmed to determine the activation level by retrieving a value from its memory based on the location signal, at least two different values corresponding to respective activation levels being stored in the memory.

27. The apparatus of claim 24 wherein the controller is further programmed to determine the activation level by performing an arithmetic calculation based on the location signal.

28. The apparatus of claim 18 wherein the vacuum supply sensor measures vacuum pressure relative to ambient air pressure.

29. The apparatus of claim 18 wherein the vacuum supply sensor measures absolute pressure.

30. An apparatus for use with brake systems of a tow vehicle and a trailer towed by the tow vehicle, the apparatus comprising:
a vacuum supply sensor coupled to sense a vacuum supply of the trailer brake system, and generating a vacuum supply level signal based on a pressure of the vacuum supply;
an altimeter circuit generating an elevation signal; and
a controller coupled to the vacuum supply sensor and to the altimeter circuit, the controller generating a vacuum pump switch signal based on the vacuum supply level signal and the elevation signal.

31. The apparatus of claim 30 further comprising:
a vacuum pump coupled to the controller, and generating vacuum for the supply based on the vacuum pump switch signal.

32. The apparatus of claim 30 wherein the controller is programmed to determine a deactivation level for the vacuum pump switch signal.

33. The apparatus of claim 32 wherein the controller is further programmed to deactivate the vacuum pump switch signal from an activated state if the vacuum supply level signal represents a value that is equal to or greater than the deactivation level.

34. The apparatus of claim 32 wherein the controller is further programmed to determine the deactivation level by retrieving a value from its memory based on the elevation signal, at least two different values for corresponding deactivation levels being stored in the memory.

35. The apparatus of claim 32 wherein the controller is further programmed to determine the deactivation level by performing a calculation based on the elevation signal.

36. The apparatus of claim 30 wherein the controller is programmed to determine an activation level for the vacuum pump switch signal.

37. The apparatus of claim 36 wherein the controller is programmed to activate the vacuum pump switch signal from a deactivated state if the vacuum supply level signal represents a value that is equal to or less than the activation level.

38. The apparatus of claim 36 wherein the controller is further programmed to determine the activation level by retrieving a value from its memory based on the elevation signal, at least two different values for corresponding activation levels being stored in the memory.

39. The apparatus of claim 36 wherein the controller is further programmed to determine the activation level by performing a calculation based on the elevation signal.

40. The apparatus of claim 30 wherein the vacuum supply sensor measures vacuum pressure relative to ambient air pressure.

41. The apparatus of claim 30 wherein the vacuum supply sensor measures absolute pressure.

42. An apparatus for use with brake systems of a tow vehicle and a trailer towed by the tow vehicle, the apparatus comprising:
a vacuum supply sensor coupled to sense a vacuum supply of the trailer brake system, and generating a vacuum supply level signal based on a pressure of the vacuum supply;
at least one switch having at least two different positions and configured to supply a deactivation level selection;
a controller coupled to the vacuum supply sensor and to the switch, the controller generating a vacuum pump switch signal based on the vacuum supply level signal, the controller being programmed to retrieve a deactivation level from its memory based on a position of the switch, and further programmed to deactivate the vacuum pump switch signal from an activated state when the vacuum supply signal level is greater than or equal to the deactivation level retrieved from the memory.

43. An apparatus for use with driver-operated brake systems of a tow vehicle and a trailer towed by the tow vehicle, the apparatus comprising:
a vacuum supply sensor coupled to sense a vacuum supply of the trailer brake system used to generate a vacuum control signal based on a brake fluid control signal generated by operation of the tow vehicle brake system by the driver, the vacuum supply sensor generating a vacuum supply level signal based on a pressure of the vacuum supply;
an ambient pressure sensor generating an ambient pressure signal;
a controller coupled to the vacuum sensor and to the ambient pressure sensor, the controller generating a vacuum pump switch signal based on the vacuum supply level signal and the ambient pressure signal; and
a vacuum pump coupled to the controller, and generating vacuum for the supply based on the vacuum pump switch signal.

44. The apparatus of claim 43, further comprising:
a control valve coupled to receive the brake fluid control signal and coupled to the trailer brake system, the control valve using the vacuum supply to generate the brake fluid control signal based on operation of the tow vehicle brake system.

45. A method comprising the steps of:
a) sensing a pressure level of a vacuum supply;
b) sensing a pressure level of ambient air;
c) determining at least one of an activation level and a deactivation level based on the sensed ambient air pressure;
d) comparing the sensed pressure level of the vacuum supply, with the activation level and/or the deactivation level;
e) generating a vacuum pump switch signal based on the comparison in said step (d)
f) sensing a brake fluid signal used to operate a brake system of a vehicle towing a trailer; and
g) generating a vacuum control signal with the vacuum supply to operate a trailer brake system, based on the brake fluid signal sensed in said step (f).

46. A method comprising the steps of:
a) sensing a pressure level of a vacuum supply;
b) determining an elevation of a trailer brake system;
c) determining at least one of an activation level and a deactivation level based on the elevation determined in step (b);
d) comparing the sensed pressure level of the vacuum supply with the activation level and/or the deactivation level; and
e) generating a vacuum pump switch signal based on the comparison in said step (d).

47. The method of claim 46 further comprising:
f) sensing a brake fluid signal used to operate a brake system of a vehicle towing a trailer; and
g) generating a vacuum control signal with the vacuum supply to operate a trailer brake system, based on the brake fluid signal sensed in said step (f).

48. The method of claim 46 wherein the pressure of a vacuum supply is sensed in step (a) using a vacuum supply sensor.

49. The method of claim 46 wherein the elevation is determined in step (b) using a GPS receiver.

50. The method of claim 46 wherein the elevation is determined in step (b) using an altimeter circuit.

51. The method of claim 46 wherein the elevation is determined in step (b) based on an ambient pressure reading.

52. The method of claim 46 wherein the at least one of an activation level and a deactivation level is determined in step (c) using a controller.

53. The method of claim 46 wherein the sensed pressure level of the vacuum supply is compared to the activation level and/or the deactivation level in step (d) using a controller.

54. The method of claim 46 wherein the vacuum pump switch signal is generated in step (e) using a controller.

* * * * *